(12) United States Patent
Walkinshaw et al.

(10) Patent No.: US 6,491,254 B1
(45) Date of Patent: Dec. 10, 2002

(54) ENVIRONMENT CONTROL SYSTEM FOR AIRCRAFT HAVING INTERIOR CONDENSATION PROBLEM REDUCTION, CABIN AIR QUALITY IMPROVEMENT, FIRE SUPPRESSION AND FIRE VENTING FUNCTIONS

(75) Inventors: Douglas S. Walkinshaw, Ottawa; Gintautas P. Mitalas, Nepean; Campbell S. L. McNeil, Kanata; Keith F. Preston, Ottawa, all of (CA)

(73) Assignee: Indoor Air Technologies Inc., Ottawa (CA)

(*) Notice: Subject to any disclaimer, the term of this patent is extended or adjusted under 35 U.S.C. 154(b) by 0 days.

(21) Appl. No.: 09/857,220

(22) PCT Filed: Dec. 20, 1999

(86) PCT No.: PCT/CA99/01215

§ 371 (c)(1),
(2), (4) Date: Jun. 20, 2001

(87) PCT Pub. No.: WO00/37313

PCT Pub. Date: Jun. 29, 2000

(30) Foreign Application Priority Data

Dec. 21, 1998 (CA) .......................................... 2256887

(51) Int. Cl.⁷ .............................................. B64D 13/00

(52) U.S. Cl. .................... 244/118.5; 244/119; 244/121

(58) Field of Search ...................... 244/117 R, 117 A, 244/119, 118.1, 118.5, 129.1, 134 R, 134 B, 121, 133, 158 A; 52/407.1, 407.5; 165/41; 62/239

(56) References Cited

U.S. PATENT DOCUMENTS

| | | | | |
|---|---|---|---|---|
| 4,688,745 A | * | 8/1987 | Rosenthal | ............... 244/134 B |
| 4,726,426 A | | 2/1988 | Miller | |
| 4,843,786 A | | 7/1989 | Walkinshaw et al. | |
| 5,386,952 A | | 2/1995 | Nordstrom et al. | |
| 5,398,889 A | * | 3/1995 | White et al. | ................. 244/119 |
| 5,779,193 A | | 7/1998 | Sloan | |
| 5,788,184 A | | 8/1998 | Eddy | |
| 5,897,079 A | | 4/1999 | Specht et al. | |

* cited by examiner

Primary Examiner—Galen L. Barefoot
(74) Attorney, Agent, or Firm—Hoffman, Wasson & Gitler

(57) ABSTRACT

An environment control system for a body of an aircraft that provides controlled ventilation of the interior space of an aircraft body, facilitating reduction of volatile organic compounds (VOCs) within cabin air, dehumidifying and reducing moisture condensation and thus corrosion and other moisture related problems within the envelope, allowing increased humidification of cabin air, and allowing suppression of fires within the envelope. The environment control system includes at least a cabin and an envelope. It includes supply means for supplying a flow of dry ventilation air to the aircraft body. An airflow control device is capable of dividing the flow of ventilation air onto an envelope ventilation air stream and a cabin ventilation air stream. An envelope ventilation duct system directs the envelope ventilation air stream into the envelope, and a cabin duct system directs the cabin ventilation air stream into the cabin. An anti-corrosion/sorption treatment is applied to surface subject to condensation in the envelope. A return air control unit is provided for selectively drawing return air from one of the envelope and the cabin. The environment control system can be incorporated into new aircraft construction, or can be installed as a retro-fit into existing aircraft.

77 Claims, 14 Drawing Sheets

ENVIRONMENT CONTROL SYSTEM FOR AIRCRAFT HAVING INTERIOR CONDENSATION PROBLEM REDUCTION, CABIN AIR QUALITY IMPROVEMENT, FIRE SUPPRESSION AND FIRE VENTING FUNCTIONS

TECHNICAL FIELD

The present invention relates to a method and apparatus for controlling the environment within an enclosed space. More particularly, the present invention relates to an environmental control system for providing controlled ventilation of the interior space of an aircraft body, such that interior condensation and corrosion is reduced, cabin air quality is improved, the cabin can be humidified to healthy levels without increasing condensation and associated deleterious effects, and envelope fires can be directly suppressed and vented.

BACKGROUND OF THE INVENTION

In the embodiments of the invention described below and illustrated in the appended drawings, the "body" of an aircraft is comprised entirely within the fuselage, and excludes the wings and tail surfaces, as well as those portions of the nose and tail cones which extend beyond the respective nose and tail pressure bulkheads. However, it will be understood that the present invention is equally applicable to other aircraft geometries (such as, for example flying wing and lifting body designs). Thus in general, and for the purposes of the present invention, the "body" of an aircraft will be considered to be that portion of the aircraft which is pressurized during normal cruising flight, and within which it is desirable to control the environment in order to enhance safety and comfort of passengers and crew.

For the purposes of the present invention, the body of an aircraft is considered to be divided into a cabin, one or more cargo bays, and an envelope which surrounds both the cabin and the cargo bay(s). The terms "cabin" and "aircraft cabin" shall be understood to include all portions of the interior space of the aircraft which may be occupied during normal flight operations (i.e. the passenger cabin plus the cockpit) The term "envelope" shall be understood to refer to that portion of the aircraft body between the cabin (and any cargo bays), and the exterior surface of the pressure shell (including any pressure bulkheads) of the aircraft. In a conventional jet transport aircraft, the envelope typically comprises inter alia the exterior fuselage skin; nose, tail and wing root pressure bulkheads; insulation blankets; wire bundles; structural members; ductwork and the cabin (and/or cargo bay) liner.

The term "ventilation air" is defined as outside air typically introduced as bleed air from an engine compressor. For the purposes of this invention, "ventilation air" shall be understood to be outdoor air brought into the cabin by any means, for example, engine bleed air, either with or without filtering. "Ventilation air" does not include recirculation air or cabin air, filtered or otherwise reconditioned, which is supplied back into the interior space of the aircraft. For the purposes of this invention, "recirculation air" shall be understood to comprise air drawn from the interior space of the aircraft, possibly conditioned, and then returned to the cabin.

To facilitate understanding of the present invention, the following paragraphs present an outline of condensation/corrosion, air quality, and fire problems encountered in typical jet transport aircraft, and conventional measures taken to address such problems.

Moisture Condensation Problems

Aircraft are subjected to sub-zero temperatures (e.g., $-50°$ C.) when flying at cruising altitudes. While the aircraft skin is slightly warmer than outside air due to air friction, temperatures behind and within the insulation blankets (particularly adjacent the skin) cool to $0°$ C. to $-40°$ C., depending upon flight duration and altitude. When cabin air passes behind the insulation, it can reach the temperature at which its moisture starts to condense (i.e., its dew point). Further cooling beyond this temperature will result in additional condensation (as liquid water or ice) on the skin and other cold sinks.

Cabin air circulates behind the insulation, drawn through cracks and openings by pressure differences created when the cabin is depressurized during ascent for example, and during flight by stack pressures (buoyancy effect). Stack pressures are created by density differences between the cooler air behind the insulation and the warmer air in front of the insulation. The density difference creates a slight negative pressure in the envelope (relative to the cabin) near the ceiling of the cabin and a slight positive pressure in the envelope near the floor of the cabin.

The effects of this condensation range from a simple nuisance through increased operation costs to decreased aircraft life. The more an airplane is used, the greater its occupant density and the lower the ventilation rate per person, the higher its potential for condensation problems. Cases have been reported of water dripping from the cabin paneling. Wetting of insulation increases thermal conduction and, over time, adds weight, increasing operating costs. This condensation increases the potential for electrical failure. It can lead to the growth of bacteria and fungi. It causes corrosion, leading to earlier fatigue failure and reduced aircraft life. Some estimates place capital and maintenance costs attributable to such condensation at up to $100,000 annually for larger, heavily utilized passenger aircraft.

Conventionally, passive measures have been used to cope with the envelope moisture problem. These include anti-corrosion coatings, drainage systems, and deliberately maintaining cabin humidity well below American Society of Air-Conditioning Engineers (ASHRAE) Standard recommended levels.

U.S. Pat. No. 5,386,952 (Nordstrom) teaches a method for preventing moisture problems by injecting dehumidified cabin air into the envelope. However, the installation of dehumidifiers, as taught by Nordstrom, increases electrical consumption, occupies additional volume, and adds dead weight. Thus in a recently published study ("Controlling Nuisance Moisture in Commercial Airplanes") Boeing Aircraft Company concluded that active dehumidification systems, such as those taught by Nordstrom, are not cost-effective, even though they can reduce moisture condensation within the envelope. Additionally, the dehumidification system taught by Nordstrom is incapable of addressing related cabin air quality issues, as described below.

Cabin Air Quality

Relative humidities above 65 percent which commonly occur in aircraft envelopes for even relatively low cabin humidities can support microbial growth under appropriate temperature conditions. Such growth can include Gram-negative bacteria. yeasts and fungi. Where sludge builds up anaerobic bacteria may grow, producing foul smelling metabolites. Saprophytic microorganisms provide nutriment for Protozoa. Exposure to aerosols and volatile organic compounds (VOCs) from such microbial growth can result in allergenic reactions and illness.

The relative humidity of outside air at typical cruising altitudes is frequently less than 1–2% when heated and pressurized to cabin conditions. Consequently, since cabin air normally is not humidified, on longer flights some passengers may experience dryness and irritation of the skin, eyes and respiratory system, while asthmatics may suffer incidences of bronchoconstriction. High air circulation velocities compound this problem. While humidification of the cabin air during flight would alleviate the "dryness" problem, it would also exacerbate the potential for microbial growth and damp material off-gassing in the envelope.

Thus, although it would be of benefit for health purposes to maintain higher cabin air relative humidities which are within the ASHRAE (American Society of Heating, Refrigerating and Air-Conditioning Engineers) Standard, this is made impracticable by the envelope condensation problem.

Other air contaminants in aircraft causing sensory irritation and other health effects can originate from ventilation air, passengers, materials, food, envelope anti-corrosion treatments, envelope microbial growth, etc. Ventilation air contaminants originate outdoors and within the engine (when bleed air is used). Potential contaminant gases and particulate aerosols include:

- combusted, partially combusted and uncombusted hydrocarbons (alkanes, aromatics, polycyclic aromatics, aldehydes, ketones);
- deicing fluids;
- ozone, possibly ingested during the cruise portion of the flight cycle; and
- hydraulic fluids and lubricating oils, possibly originating from seal leakage within the engine.

Gas chromatography/mass spectrometry (GC/MS) head space analyses of engine lubricating oil (FIG. 9a), jet fuel (FIG. 9b), and hydraulic fluid (FIG. 9c) indicate some of the potential VOCs that might be found in aircraft ventilation air.

FIG. 8a shows a GC/MS plot of a ventilation air sample taken in a jet passenger aircraft during the cruise portion of the flight cycle (28000 ft and −34° C.) The total concentration was 0.27 mg/m$^3$ at a cabin pressure altitude of approximately 8000 ft. For comparison, ventilation air VOC concentrations for downtown buildings typically are less than a third of this concentration. VOCs identified include 3-methyl pentane, hexane, 3-methyl hexane, toluene, hexanal, xylene, and many C9–C12 alkanes. Additional compounds reported by other researchers include formaldehyde, benzene and ethyl benzene. Many of the compounds in the jet fuel (FIG. 9b) can be seen in this ventilation air sample. The total VOC (TVOC) concentration was 0.27 mg/m$^3$ at a cabin pressure altitude of approximately 8000 ft. Of this some 0.23 mg/m$^3$ could have a petroleum (combustion source). The TVOC concentration is equivalent to a TOC exposure of 0.36 mg/m$^3$ at sea level. In comparison, urban residential ventilation air TVOC concentrations are typically less than one-third this aircraft ventilation air concentration (i.e., <0.03 mg/m$^3$), and building room air TVOC concentrations typically are less than 0.5 mg/m$^3$. One postulate for the high VOC concentrations found in aircraft is that periodic incidents of lubricating oil leakage produce aerosols which enter the ventilation system and progressively coat the interior surfaces of the supply ducts. This coating, in turn, could sorb VOC's ingested during taxi from the exhaust of other aircraft. These VOC's may subsequently be released into the cabin during flight.

Contaminated ventilation air increases ventilation rate requirements to achieve any particular space concentration target. For example, a ventilation rate with TVOCs=0.36 mg/m$^3$ must be three times higher than one with TVOCs=0.036 mg/m$^3$ to maintain a room TVOC concentration of 0.5 mg/m$^3$.

Cabin air contaminants can originate from materials and, possibly microbial growth in the envelope as well as from cabin furnishings, food and passengers. Contaminants in the envelope enter the cabin when cabin air is circulated behind the insulation drawn there by envelope stack pressures and by decreasing cabin pressures (for example, during ascent).

FIG. 8b shows a GC/MS plot of envelope air in an aircraft parked when the temperature in the air space between the skin and insulation was approximately 35° C. The total (TVOC) concentration was 22 mg/m$^3$. Of this, some 21 mg/m$^3$ had a petroleum source and 0.6 mg/m$^3$ could have had a microbial source. VOCs from one source of these envelope contaminants, an anti-corrosion treatment, is illustrated in FIG. 9e. This head space sample was taken at −5° C., a temperature representative of the temperature behind the insulation during the early portions of cruising flight. This anti-corrosion treatment emitted many of the compounds seen in the envelope and the ventilation air, plus a number of cycloalkanes and aliphatics not seen in the other samples. FIG. 9d shows the head space GC/MS plot of a general purpose cleaner (2-butanone or methyl ethyl ketone) used on this aircraft. This compound was also identified in the envelope, engine oil, ventilation air and anti-corrosion treatment samples.

When the envelope is cooled in flight or warmed on the ground, envelope material off-gassing and sorption of contaminant gases change. For example under ideal conditions, the deposition of VOCs of interest behind the insulation could increase a hundred-fold for temperature decreases over the typical flight cycle temperature range.

Condensation of higher molecular weight compounds at higher concentrations may occur when the envelope is cooled. For example, the maximum concentration of dodecane (a compound found in the ventilation air and anti-corrosion treatment samples), at −40° C. is 0.26 mg/m$^3$.

One implication of the above is that during the ascent and the early portions of the cruise flight cycle while the envelope is still relatively warm, envelope VOCs could pose an air quality problem for passengers. Another implication is that cabin air VOCs will be deposited (sorbed) in the envelope when it is cold, particularly during later stages of the cruise portion of the flight cycle. For example, both ventilation air VOCs (FIG. 8a) and the cabin cleaner VOC (FIG. 9d) can be found in the envelope air sample (FIG. 8b).

Some aircraft have high efficiency particulate filters (HEPA) filters which will remove human microbial aerosols that enter the circulation system. Some have catalytic converters to remove ozone. Very few have sorbent air cleaners to remove ventilation-air and cabin VOCs.

Fire and/or Pyrolysis in the Envelope

In the case of a fire, thermal and electrical insulation systems in the envelope as well as other materials in the cabin can undergo pyrolysis and burning, generating toxic smoke and combustion products. Conventionally, this problem is addressed by employing fewer combustible materials, and using hand-held containers with non-toxic fire suppressants. Currently, insulation is under review in this regard with a prevention program potentially involving more than 12,000 commercial aircraft.

Under any cabin fire emergency, the objective is to exhaust the smoke from the cabin while suppressing the fire. There is currently no method in place to directly suppress or extinguish fire and/or pyrolysis within the envelope. Nor is there any effective means of preventing smoke within the envelop from penetrating into the cabin. Furthermore, exhaustion of air from the cabin is usually via grilles at the floor. which undesirably enhances smoke circulation throughout the cabin.

U.S. Pat. No 4,726,426 (Miller) teaches a method of fire extinguishment in aircraft cabins using ventilation ducts in communication with the cargo fire extinguishment system. However, this system does not address envelope fires and/or pyrolysis, or the health and safety problems associated with exposing, passengers to potentially lethal combinations of fire suppressants and their combustion products in combination with fire and smoke.

SUMMARY OF THE INVENTION

It is an object of the present invention to provide an environment control system that overcomes the above-noted deficiencies in the prior art.

It is a further object of the present invention to provide an environment control system capable of inhibiting moist cabin air from contacting cold surfaces of the envelope, thereby reducing moisture condensation within the envelope, and associated "rain-in-the-plane", electrical failures, corrosion, microbial growth, and dead weight.

It is a further object of the present invention to provide an environment control system capable of reducing infiltration of smoke from the envelope into the interior cabin space, thereby increasing passenger and crew safety during an in-flight fire situation.

It is a further object of the present invention to provide an environment control system capable of improving cabin indoor air quality (IAQ) by at least partially removing contaminants from ventilation air prior to entering the cabin.

Accordingly, an aspect of the present invention provides an environment control system for an aircraft including at least a pressure shell, an interior space including one or more of a cabin and a cargo hold, an envelope extending between the interior space and the pressure shell and a liner disposed between the interior space and the envelope. The environment control system comprises an envelope air distribution system having a plurality of nozzles located at spaced intervals and adapted to distribute an envelope air stream within the envelope in such a manner as to at least partially offset stack effect pressures.

Another aspect of the present invention provides an environment control system for an aircraft including at least a pressure shell, an interior space including one or more of a cabin and a cargo hold, an envelope extending between the interior space and the pressure shell and a liner disposed between the interior space and the envelope. The environment control system comprises an envelope air distribution system adapted to supply an envelope air stream to the envelope; and one or more flow-blockers adapted to at least partially block a flow of air within the envelope.

Another aspect of the present invention provides an environment control system for an aircraft including at least a pressure shell, an interior space including one or more of a cabin and a cargo hold, an envelope extending between the interior space and the pressure shell and a liner disposed between the interior space and the envelope. The environment control system comprises an envelope air distribution system adapted to supply an envelope air stream within the envelope; and sealing means adapted to at least partially seal the liner against leakage of air between the interior space and the envelope.

In embodiments of the invention, one or more flow-blockers are provided, and adapted to at least partially block a flow of air within the envelope. The envelope air distribution system may include a plurality of nozzles located at spaced intervals and adapted to distribute the envelope air stream within the envelope in such a manner as to at least partially offset stack effect pressures. Sealing means adapted to at least partially seal the liner against leakage of air between the interior space and the envelope may be included.

In embodiments of the invention, the envelope air distribution system may further include: at least one envelope supply duct; and at least one respective ventilation air branch line in communication with the envelope supply duct and one or more respective nozzles.

An insulation blanket may be disposed within the envelope between the liner and the pressure shell. At least one nozzle may be a shell-side nozzle adapted to inject envelope air between the insulation jacket and the pressure shell. At least one nozzle may be a cabin-side nozzle adapted to inject envelope air between the insulation jacket and the liner.

In embodiments of the invention, an air supply is adapted to generate the envelope air stream. The air supply may include an air supply duct adapted to conduct bleed air from a compressor stage of an engine of the aircraft into the body of the aircraft as ventilation air. The air supply may also include an airflow control device adapted to divide the flow of ventilation air into the envelope air stream and a cabin air stream. An air conditioner pack adapted to cool the ventilation air may also be included. The airflow control device may include at least one valve adapted for controlling the envelope air stream and the cabin air stream to maintain a predetermined pressure difference between the cabin and the envelope.

In embodiments of the invention, a cabin air distribution system is adapted to distribute the cabin air stream within the interior space of the aircraft body. The cabin air distribution system may include: an air conditioner communicating with the airflow control device for receiving at least a portion of the cabin air stream, and adapted to condition the cabin air stream to create cabin supply air; and a cabin supply air duct adapted to direct the cabin supply air into the cabin. The air conditioner may be adapted to control the relative humidity of the cabin supply air, e.g. to maintain a cabin relative humidity level in excess of 20%.

In embodiments of the invention, the sealing means is adapted to limit a leakage area of the cabin liner such that a predetermined pressure difference between the interior space and the envelope can be maintained at a predetermined minimum ventilation rate. The minimum ventilation rate may be about 0.55 lbs per passenger or less. The leakage area may be equivalent to about 73 cm$^2$) per passenger, or less.

In embodiments of the invention, at least one flow blocker is arranged to reduce stack effect air flows within the envelope. The flow-blockers may be arranged to divide the envelope into one or more sections. In such cases, the envelope air distribution system may be adapted to control envelope ventilation within a section independently of other sections. At least one section may formed by dividing at least a portion of the envelope longitudinally, e.g. to form at least one section within a crown of the envelope. At least one section may be formed by dividing the envelope laterally, e.g. to form at least one section within a cockpit portion of the envelope. At least one section may formed by dividing the envelope both longitudinally and laterally, to form at least one section within the envelope proximal a food preparation area of the cabin.

In embodiments of the invention, a return air control unit is capable of drawing a return air stream from a selected one of the interior space and the envelope The return air control unit may include a housing, a first opening defined in the housing and in communication with the envelope, a second opening defined in the housing and in communication with the interior space, and a damper capable of selectively closing one of the first opening and the second opening. An outflow valve may be adapted to divide the return air stream into an exhaust air stream and a recirculation air stream, the exhaust air stream being vented out of the aircraft, and the recirculation air stream being supplied back to the cabin. The recirculation air stream may be supplied to the cabin via an air conditioner.

In embodiments of the invention an anti-corrosion/VOC sorption treatment is applied to an interior surface of the aircraft structure within the envelope. The anti-corrosion/VOC sorption treatment may be formulated to provide acceptable characteristics of: adhesion to metal surfaces; hydrophobic; low flammability; and low off-gassing at typical envelope temperatures during cruising flight. The anti-corrosion/VOC sorption treatment is formulated to: resist solidification within the aircraft envelope; sorb ventilation air VOCs at typical envelope temperatures during cruising flight and desorb said ventilation air VOC's at warmer temperatures substantially without hysteresis.

In embodiments of the invention, a fire suppression system is provided in communication with the envelope air distribution system. The fire suppression system is preferably capable of releasing a flow of chemical fire suppressant into at least the envelope air distribution system when smoke or fire is detected in the envelope. The fire suppression system and the envelope air distribution system may be adapted to cooperate to flood at least a portion of the envelope with the chemical fire suppressant. The fire suppression system may include a container of chemical fire suppressant, a supply line in communication with the container and the envelope air distribution system for conducting the chemical fire suppressant between the container and the envelope air distribution system and a valve capable of controlling a flow of chemical fire suppressant from the container. The chemical fire suppressant may be any one or more of Halon, carbon dioxide, nitrogen and other fire suppressant agents, or mixtures, of these.

A further aspect of the present invention provides a method of controlling the environment within an aircraft including at least a pressure shell, an interior space including one or more of a cabin and a cargo hold, an envelope extending between the interior space and the pressure shell, and a liner disposed between the interior space and the envelope, the method comprising a step of distributing an envelope air stream within the envelope through a plurality of nozzles so as to at least partially offset stack effect pressures.

Another aspect of the present invention provides a method of controlling the environment within an aircraft body including at least a pressure shell, an interior space including one or more of a cabin and a cargo hold, an envelope extending between the interior space and the pressure shell, and a liner disposed between the interior space and the envelope. The method comprises the steps of: distributing an envelope air stream within the envelope; and providing one or more flow-blockers within the envelope and adapted to at least partially block a flow of air within the envelope.

Another aspect of the present invention provides a method of controlling the environment within an aircraft body including at least a pressure shell, an interior space including one or more of a cabin and a cargo hold, an envelope extending between the interior space and the pressure shell, and a liner disposed between the interior space and the envelope. The method comprises the steps of: distributing an envelope air stream within the envelope; and at least partially sealing the liner against leakage of air between the envelope and the interior space, such that a predetermined pressure difference between the envelope and the interior space can be maintained at a predetermined minimum ventilation rate.

In embodiments of the invention the envelope air stream is distributed within the envelope through a plurality of nozzles so as to at least partially offset stack effect pressures. At least a portion of the envelope air stream may be injected into a space between the pressure shell and an insulation jacket. At least a portion of the envelope air stream may be injected into a space between an insulation jacket and the liner.

In embodiments of the invention, a return air stream may be drawn from selected one of the envelope and the cabin. The return air stream may be divided into an exhaust air stream and a recirculation air stream, the exhaust air stream being vented from the aircraft and the recirculation air stream being supplied back to the cabin.

In embodiments of the invention, a supply air stream is divided into the envelope air stream and a cabin air stream. The cabin air stream is supplied to the cabin; and the envelope air stream and the cabin air stream are controlled to maintain a predetermined pressure difference between the cabin and the envelope.

In embodiments of the invention the cabin air is humidified, and the humidified cabin air is supplied to the cabin.

In embodiments of the invention, during a cruising portion of a flight cycle. the predetermined pressure difference is selected such that the envelope is at a higher pressure than the cabin. In such cases, the return air stream may be drawn from the cabin. Similarly, a portion of the return air stream can be vented out of the aircraft, and a remaining portion of the return air stream recirculate back into the cabin.

In embodiments of the invention, during a taxi and ascent portion of a flight cycle, the predetermined pressure difference is selected such that the envelope is at a lower pressure than the cabin. In such cases, the return air stream can be drawn from the envelope, and substantially all of the return air stream may be vented out of the aircraft.

In embodiments of the invention, during an in-flight fire and/or pyrolysis within the envelope or in the cabin, the predetermined pressure difference is selected such that the envelope is at a lower pressure than the cabin. In such cases, at least a portion of the envelope can be flooded with a chemical fire suppressant, and the cabin air stream may include substantially all of the total flow of ventilation air. The return air stream may be drawn from the envelope, and substantially all of the return air stream vented out of the aircraft.

In embodiments of the invention, during ground operations of the aircraft, the return air stream is drawn from the envelope and substantially all of the return air stream is vented out of the aircraft. In such cases, the ventilation air stream may be heated to accelerate volatilization of VOCs and any moisture within the envelope.

The environment control system of the invention can be incorporated into new aircraft construction, or installed as an upgrade or retrofit in an existing aircraft.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
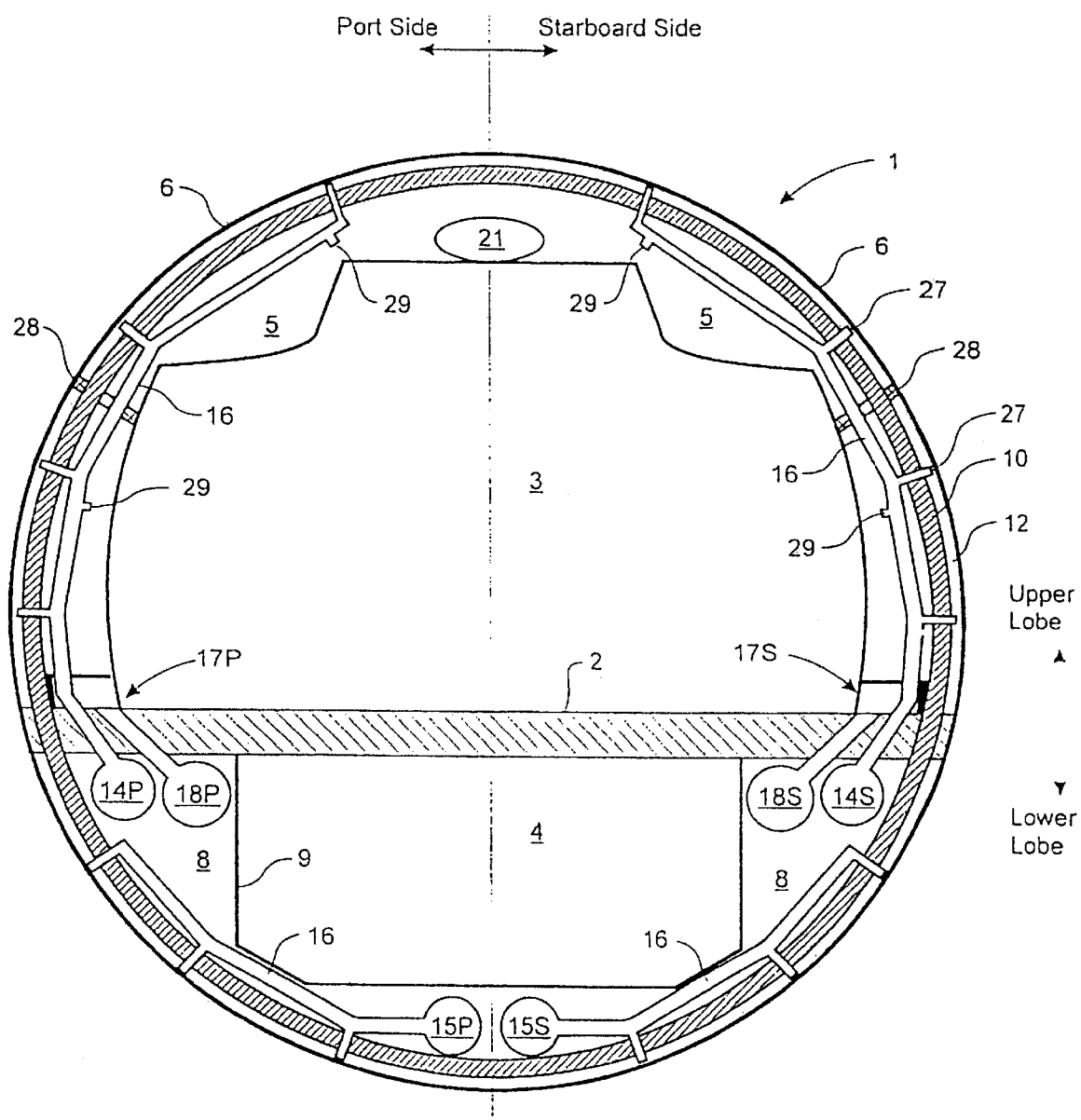
FIG. 1 shows a schematic cross sectional view through the body of an aircraft, showing components of an air handling system in accordance with an embodiment of the present invention.
Figure 2:
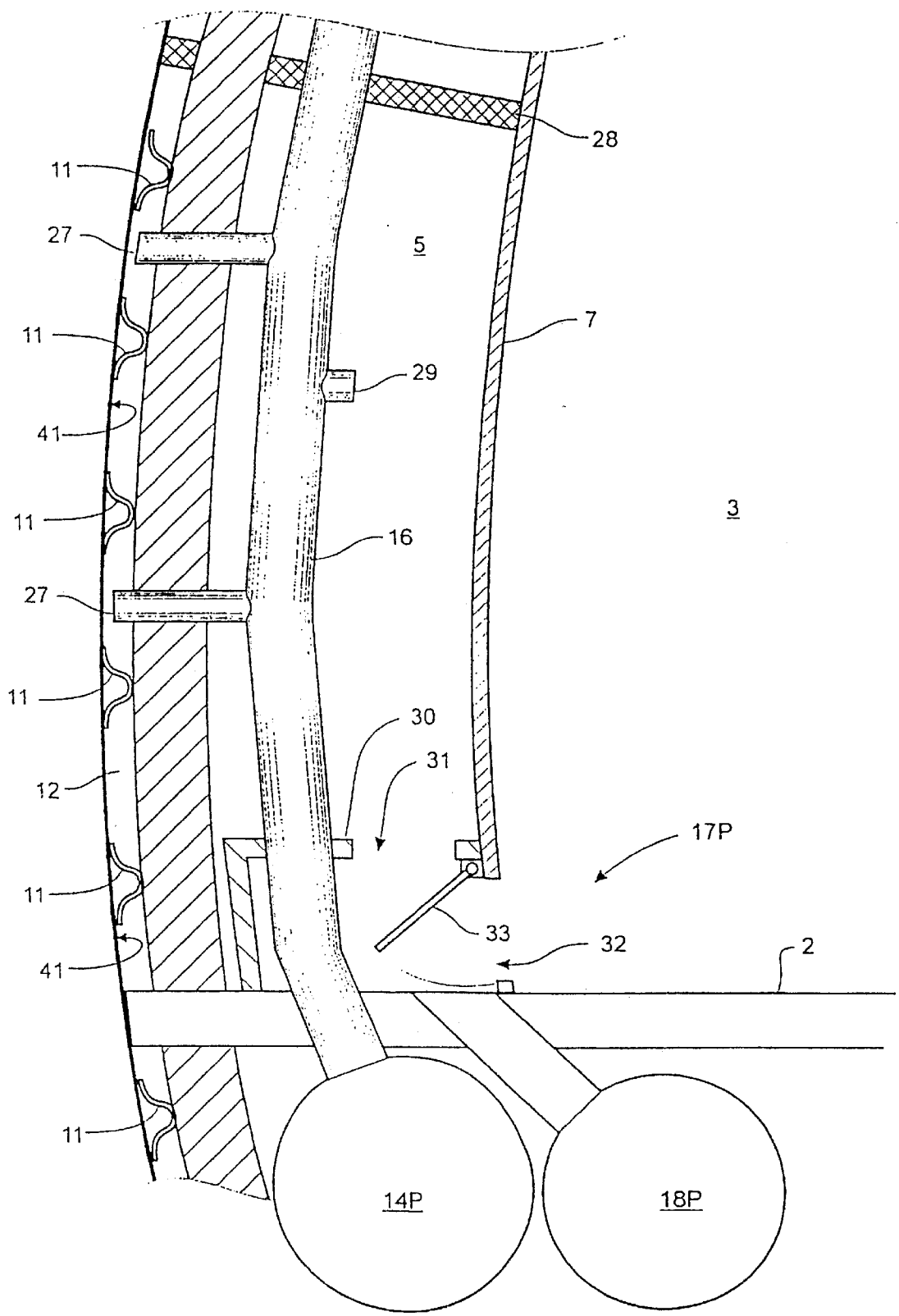
FIG. 2 is an enlarged partial cross section illustrating a portion of the embodiment of FIG. 1 in greater detail.
Figure 3:
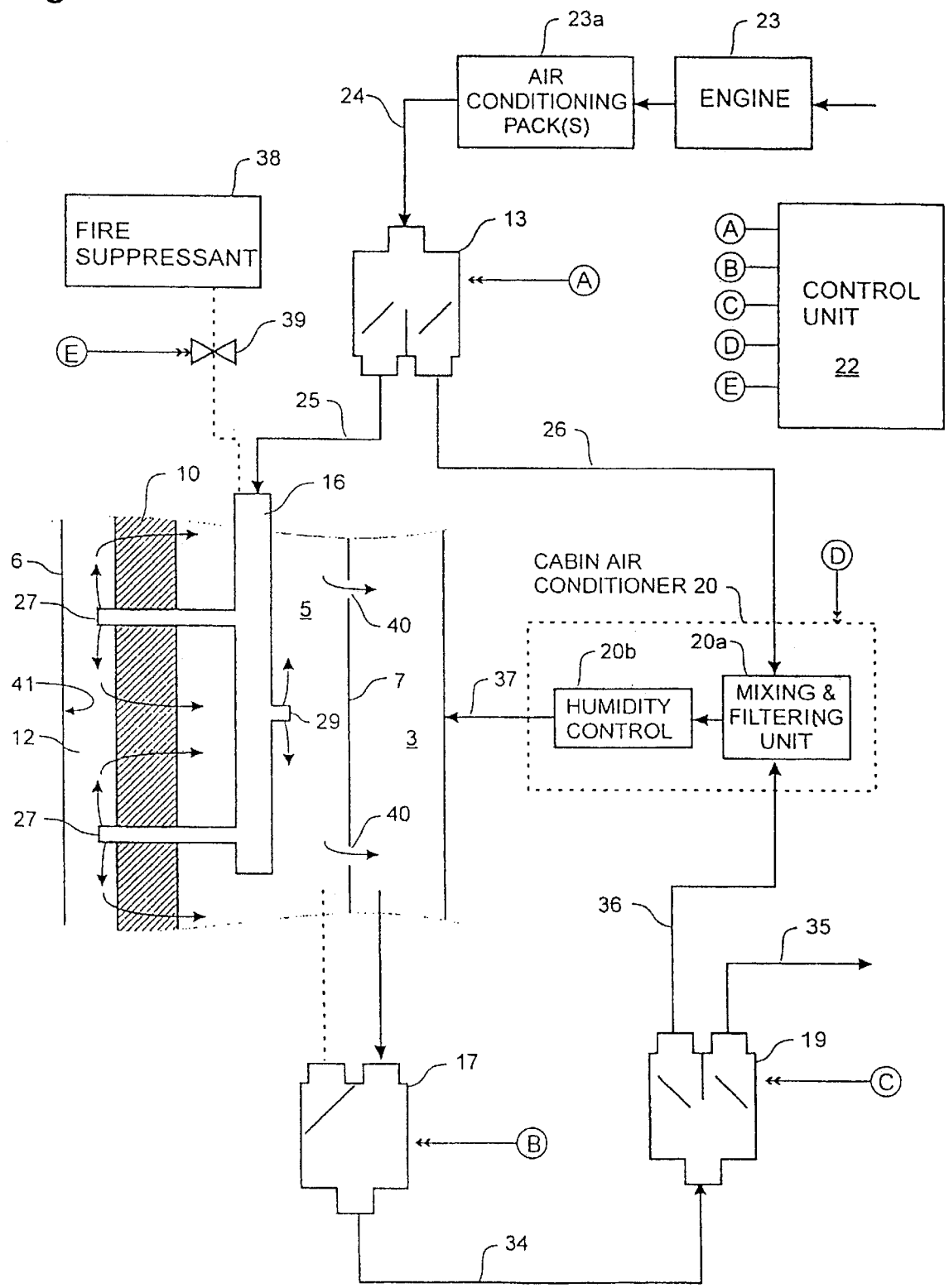
FIG. 3 is a schematic diagram illustrating the operation of the present invention during normal cruising flight.

Referring to FIGS. 1–3, the body 1 of a typical jet transport aircraft is generally divided into upper and lower lobes. FIGS. 1 and 2 show a typical cross section between adjacent ribs. The upper lobe comprises that portion of the body (fuselage) 1 that generally extends above the floor 2 to enclose the cabin 3 (which may in fact have more than one level), and is normally occupied by crew and passengers during flight. Conversely, the lower lobe comprises that portion of the body 1 that generally extends below the floor 2, and normally houses cargo bays 4. Both lobes can conveniently be subdivided into port and starboard sides, which will be symmetrical with exceptions such as doors. As may be seen in FIG. 1, the present invention can be used to provide controlled ventilation within all four quadrants of the body 1 (upper lobe-port side; upper lobe-starboard side; lower lobe-port side; and lower lobe-starboard side). For simplicity of description, the following discussion will focus on only one quadrant (upper lobe-port side) of the body, it being understood that the same provisions can be made (with appropriate substitutions of components) within each of the other quadrants as desired.

An upper lobe envelope 5 encompasses the components of the body 1 between the outer skin 6 and the cabin liner 7. Similarly, a lower lobe envelope 8 encompasses the components of the body 1 between the outer skin 6 and the cargo bay liner 9. Conventionally, an anti-corrosion treatment 41 is applied on the interior surface of the skin and on structural members within the envelope. An insulation blanket 10 is normally provided within the upper and lower lobe envelopes 5, 8 and is typically secured to the stringers 11, so that a small gap 12 normally exists between the skin 6 and the outermost surface of the insulation 10.

The present invention provides an environment control system which operates by controlling flow of air within both the cabin 3 and the upper and lower lobe envelopes 5 and 8. The system comprises an airflow control device 13; upper and lower lobe envelope supply ducts 14P, 14S, 15P and 15S which communicate with the airflow control device 13 and which run generally parallel to the aircraft longitudinal axis; one or more ventilation air branch lines 16 which communicate with each of the upper and lower lobe envelope supply ducts 14, 15 and extend into tie respective upper and lower lobe envelopes 5, 8; a plurality of return air controllers 17 which communicate with a respective main return air duct 18P, 18S; an outflow valve 19 communicating with the main return air ducts 18; a cabin air conditioner 20; a cabin supply air duct 21; and a control unit 22.

The lower lobe envelope supply ducts 15P and 15S and associated ventilation air branch lines 16 are independent of the main part of the system and can be omitted if desired.

Referring now to FIG. 3, dry ventilation air 24, for example air bled from the compressor section of an engine 23 in a conventional manner and optionally conditioned (that is, cooled and possibly dehumidified) by conventional conditioning packs 23a, is supplied to the airflow control device 13. The airflow control device 13 operates in response to control signals A from the control unit 22 (or optionally is pre-set) to divide the flow of ventilation air 24 to create an envelope air stream 25, at least a portion of which is distributed to the upper lobe port side envelope 5 through the port-side upper envelope supply duct 14P and ventilation air branch lines 16, and a cabin air stream 26 which is supplied to the cabin air conditioner 20.

In the illustrated embodiment, the airflow control device 13 is provided as a unitary control valve. However, it will be appreciated that the airflow control device 13 may be provided as any suitable combination of one or more valves; dampers, orifices or duct assemblies, which may be used in combination with conventional ventilation ducts previously existing within an aircraft. Similarly, the ventilation supply duct 14P may be a separate air supply duct, or may be a supply air duct such as cabin or gasper ventilation air supply lines, previously installed in an aircraft.

The ventilation air branch lines 16 are distributed at suitable intervals along the length of the upper envelope supply duct 14P so as to provide a distribution of envelope air 25 alone the length of the upper lobe envelope 5. The number of ventilation air branch lines 16 will, in general, depend on the tightness of the envelope (i.e. leakage between cabin and envelope) and the presence of air-flow obstructions within the envelope. In aircraft with a particularly tight cabin liner and few obstructions to longitudinal flow within the envelope, as few as one ventilation air branch line 16 may be used. In other situations, a greater number of ventilation air branch lines 16 may be preferred Conveniently, a single ventilation air branch line 16 can be provided in each rib space of the body 1. Each ventilation air branch line 16 includes a plurality (four are shown in the illustrated embodiment, see FIG. 1) of shell-side nozzles 27 which are designed to inject envelope air 25 behind the insulation 10, that is, into the space 12 between the skin 6 and the insulation 10. The shell-side nozzles 27 are distributed at suitable intervals around the circumference of the upper lobe envelope 5, so that envelope air 25 can be supplied to the envelope 5. behind the insulation 10. The number and spacing of shell-side nozzles 27 will depend on the tightness of the cabin liner, and the presence of obstructions to circumferential movement of air. Preferably, the envelope air flows are controlled to be sufficient to neutralize stack effect pressure (of up to 1.5 Pa with a least one flow blocker per side) and create slightly higher pressures in the envelope relative to the cabin (e.g., at least 0.5 Pa).

The "stack effect" is a phenomenon which occurs within the envelope and which tends to cause a circumferential flow of air within the envelope. In general envelope air between the insulation 10 and the cabin liner 7 tends to rise (because it is lower density); passes through the insulation 10 where it contacts the fuselage skin 6 and cools; the cold envelope air between the insulation 10 and the skin 6 tends to sink (because it is higher density), and passes back through the insulation 10 near the floor 2 of the cabin 3. The amount of this natural convective flow depends on cabin height, the temperature differential across the insulation 10, and the presence of flow restrictions. In a conventional aircraft fuselage, stack effect pressures of up to approximately 3 Pa or more can be encountered at cruising altitudes.

In order to reduce stack effect it is useful to provide at least one flow blocker 28 within the envelope 5 which serves to block circumferential movement of air within the envelope 5. Preferably, a flow blocker 28 is positioned between the panel 7 and the insulation 10, and squeezes the insulation against the skin 6 or stringer 11. In most conventional jet transport aircraft, a single flow blocker 28 will normally be sufficient. In such cases, the flow blocker 28 can advantageously be installed at approximately mid-height within the envelope 5 (i.e. just above the windows (not shown) on both sides of a conventional jet transport aircraft). This reduces stack effect pressures to approx. 3 Pa or less at cruising altitudes. In very large aircraft, particularly those with multi-level cabins it may be necessary to install two or more flow blockers 28 on each side.

Optionally, one or more cabin-side nozzles 29 (two are shown in the embodiment of FIG. 1) can also be provided in order to inject envelope air 25 into the upper lobe envelope 5 in front of the insulation 10, that is, between the insulation 10 and the cabin liner 7.

Figure 8A:
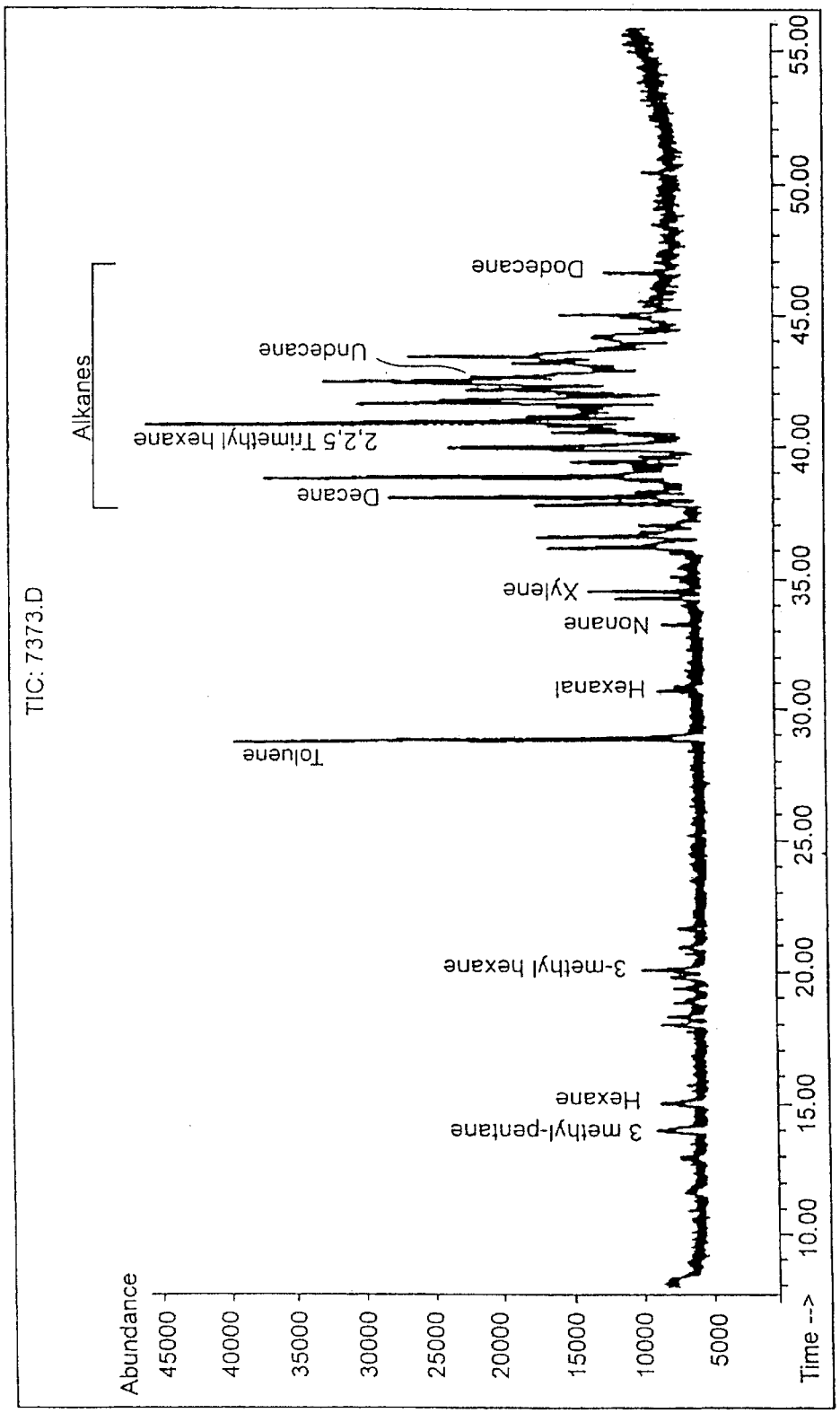
FIG. 8a shows a gas chromatography/mass spectrometry (GC/MS) analysis plot of a ventilation air sample taken in a jet transport aircraft during flight (Temperature approximately 20° C.)
Figure 8B:
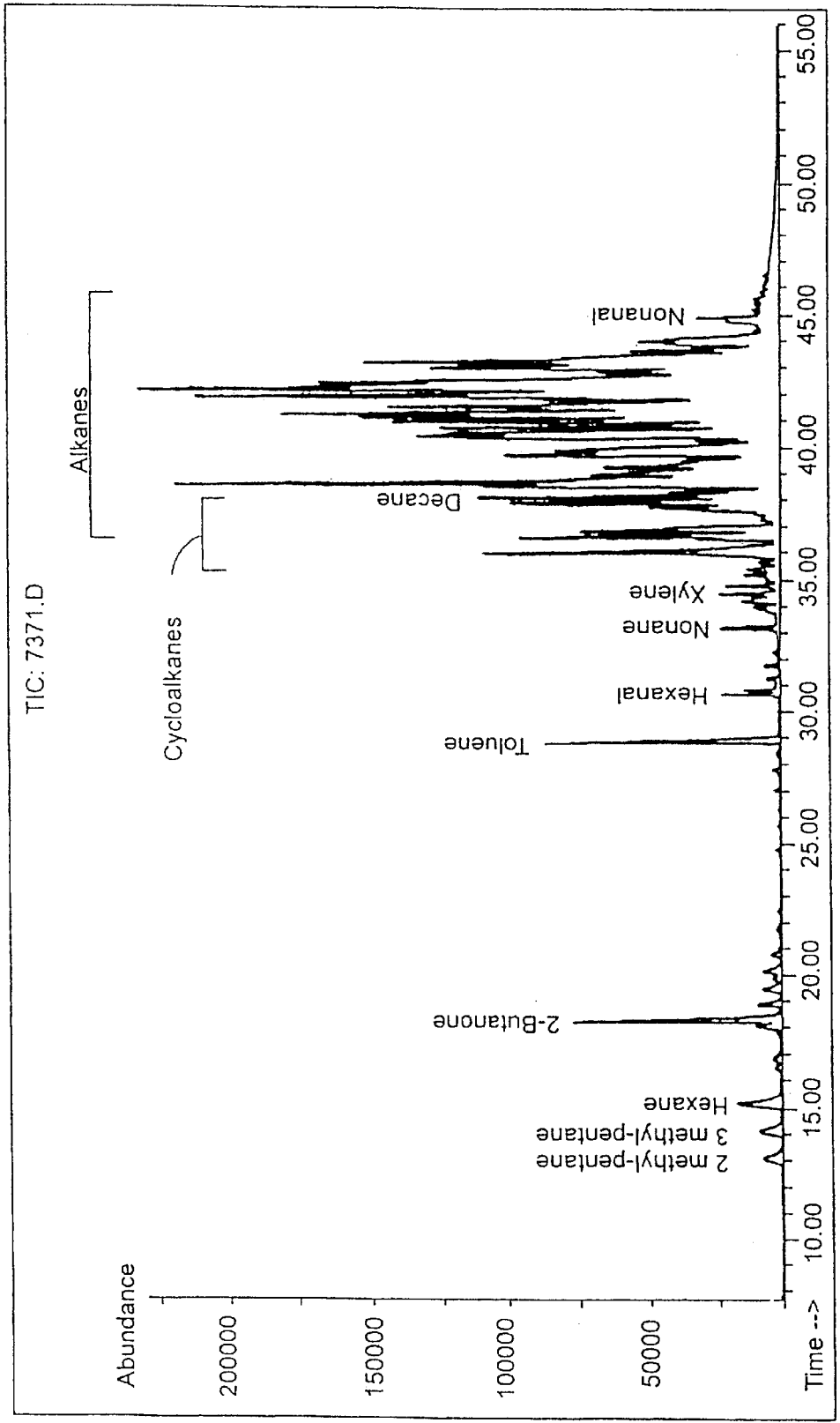
FIG. 8b shows a gas chromatography/mass spectrometry (GC/MS) analysis plot of an envelope air sample taken in a jet transport aircraft on the ground a approximately 35° C.
Figure 9A:
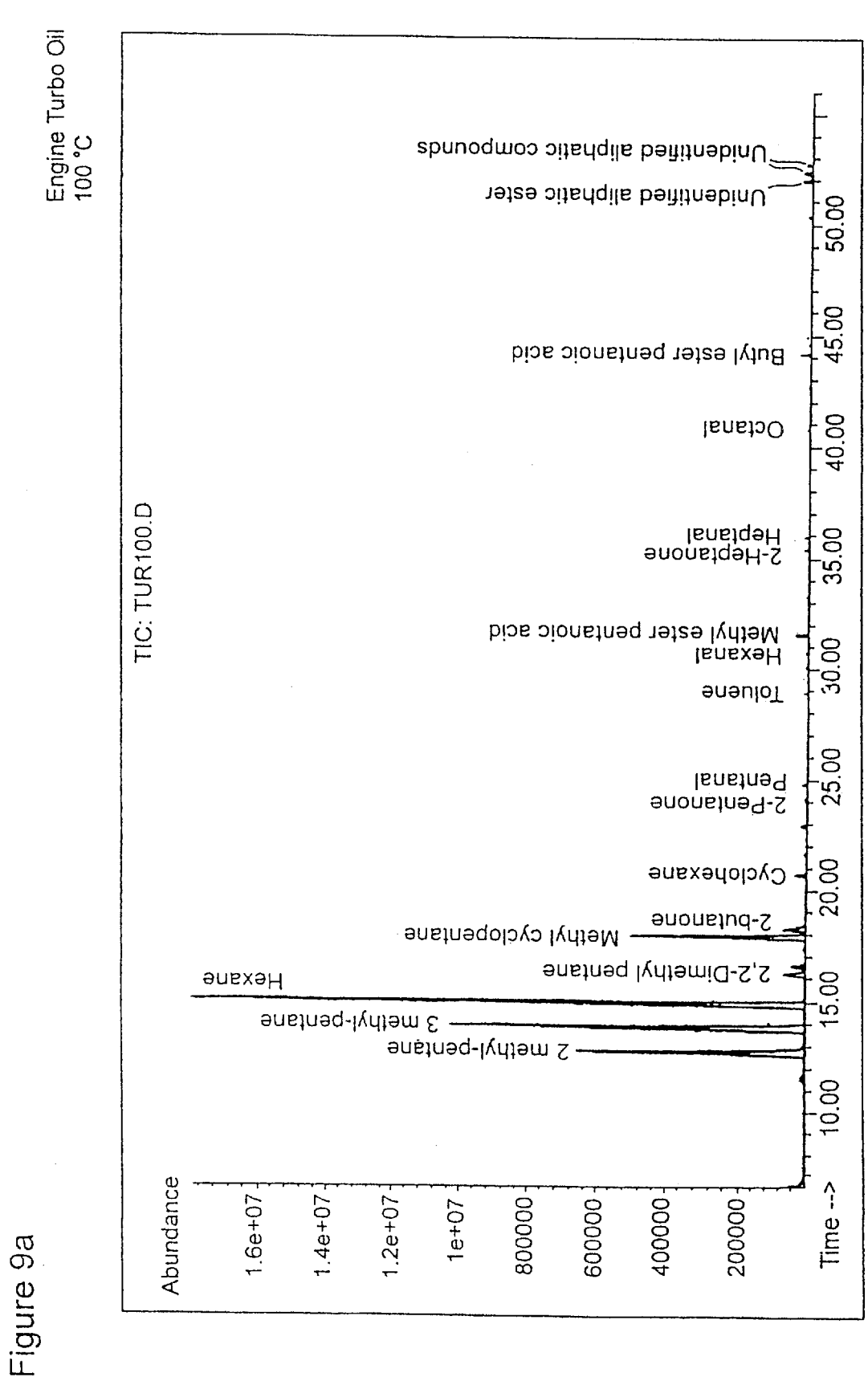
FIG. 9a shows a gas chromatography/mass spectrometry (GC/MS) analysis plot of a head space sample of a jet engine lubricating oil at 100° C.
Figure 9B:
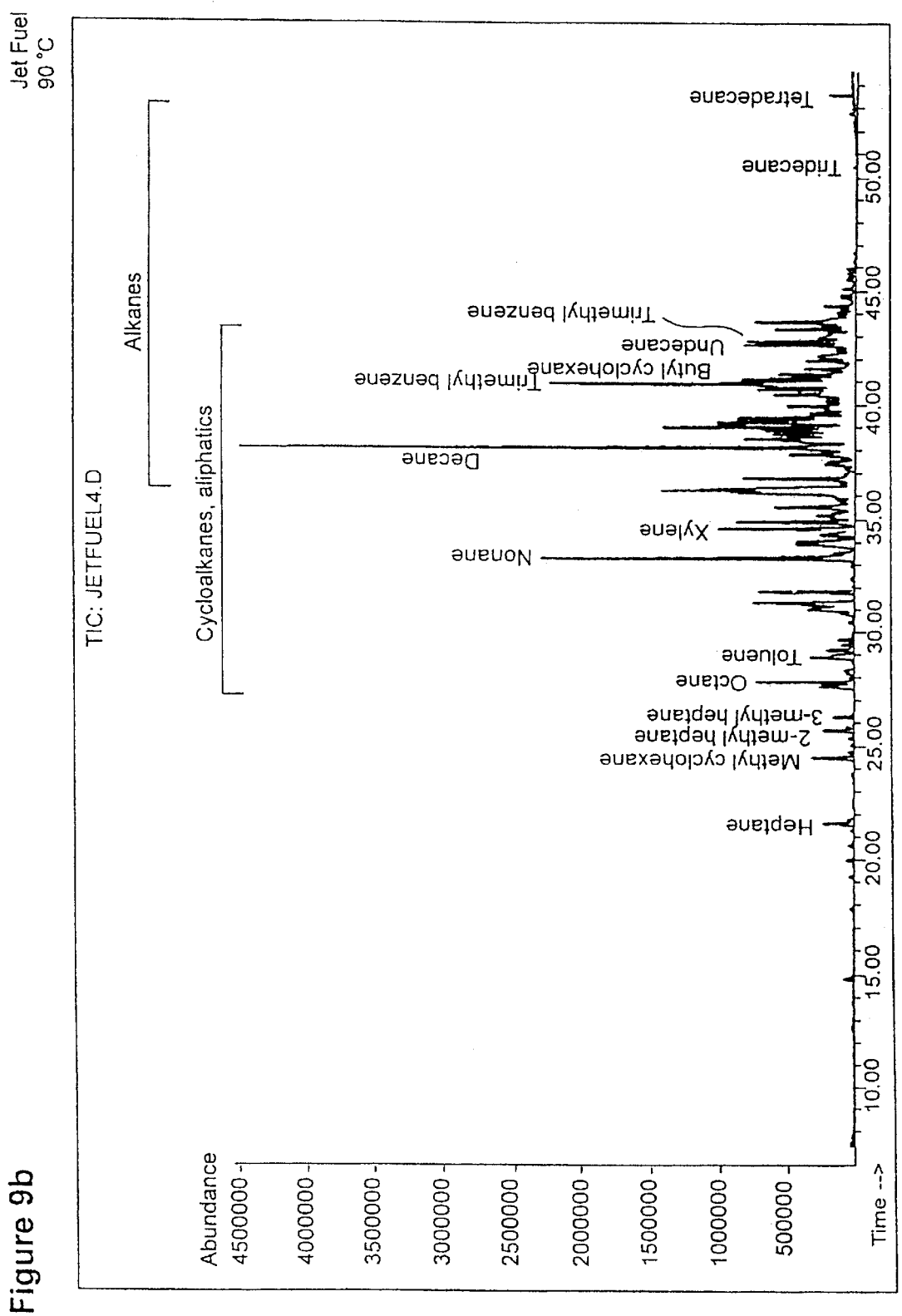
FIG. 9b shows a gas chromatography/mass spectrometry (GC/MS) analysis plot of a head space sample of a jet fuel at 90° C.
Figure 9C:
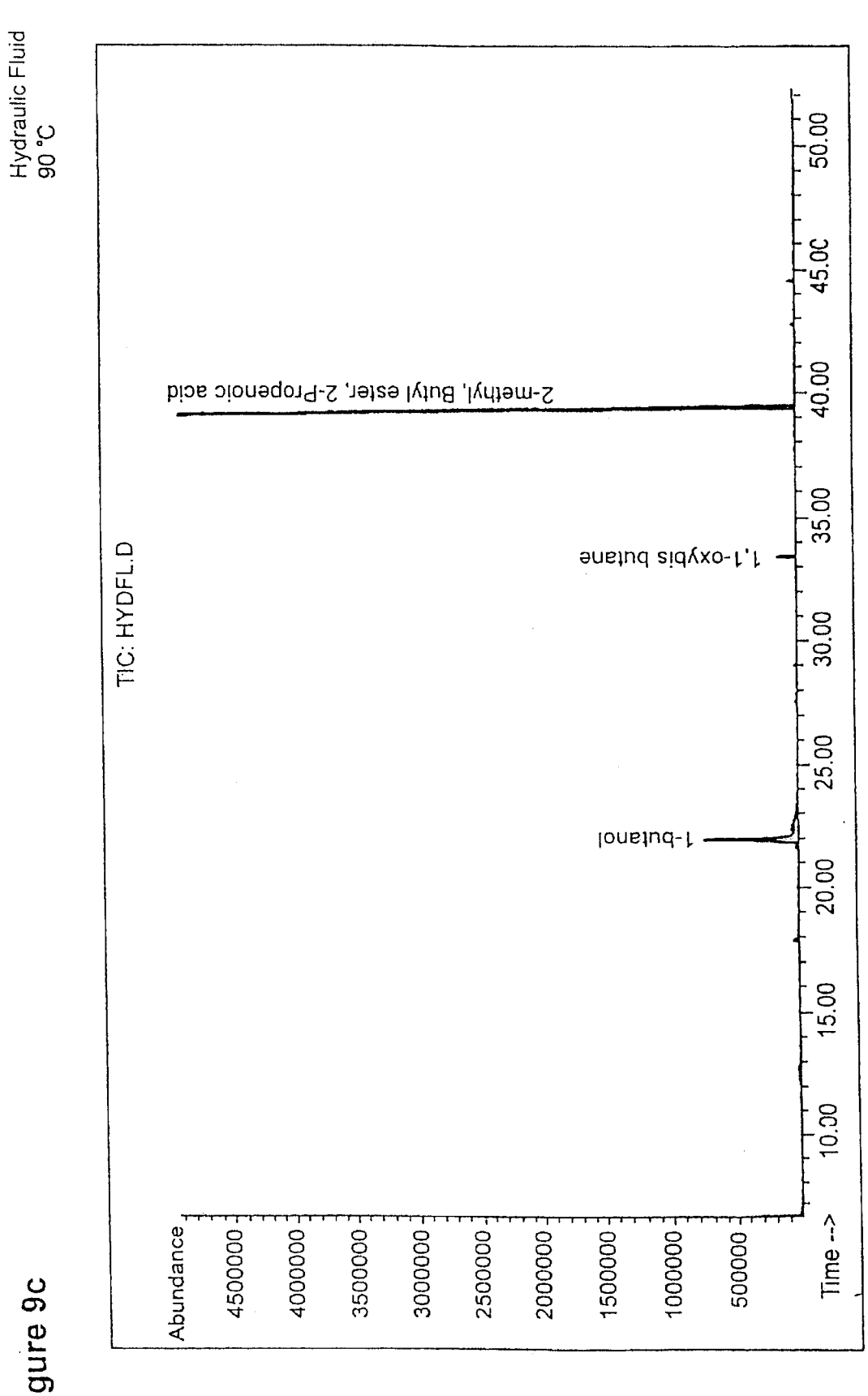
FIG. 9c shows a gas chromatography/mass spectrometry (GC/MS) analysis plot of a head space sample of an aircraft hydraulic fluid at 90° C.
Figure 9D:
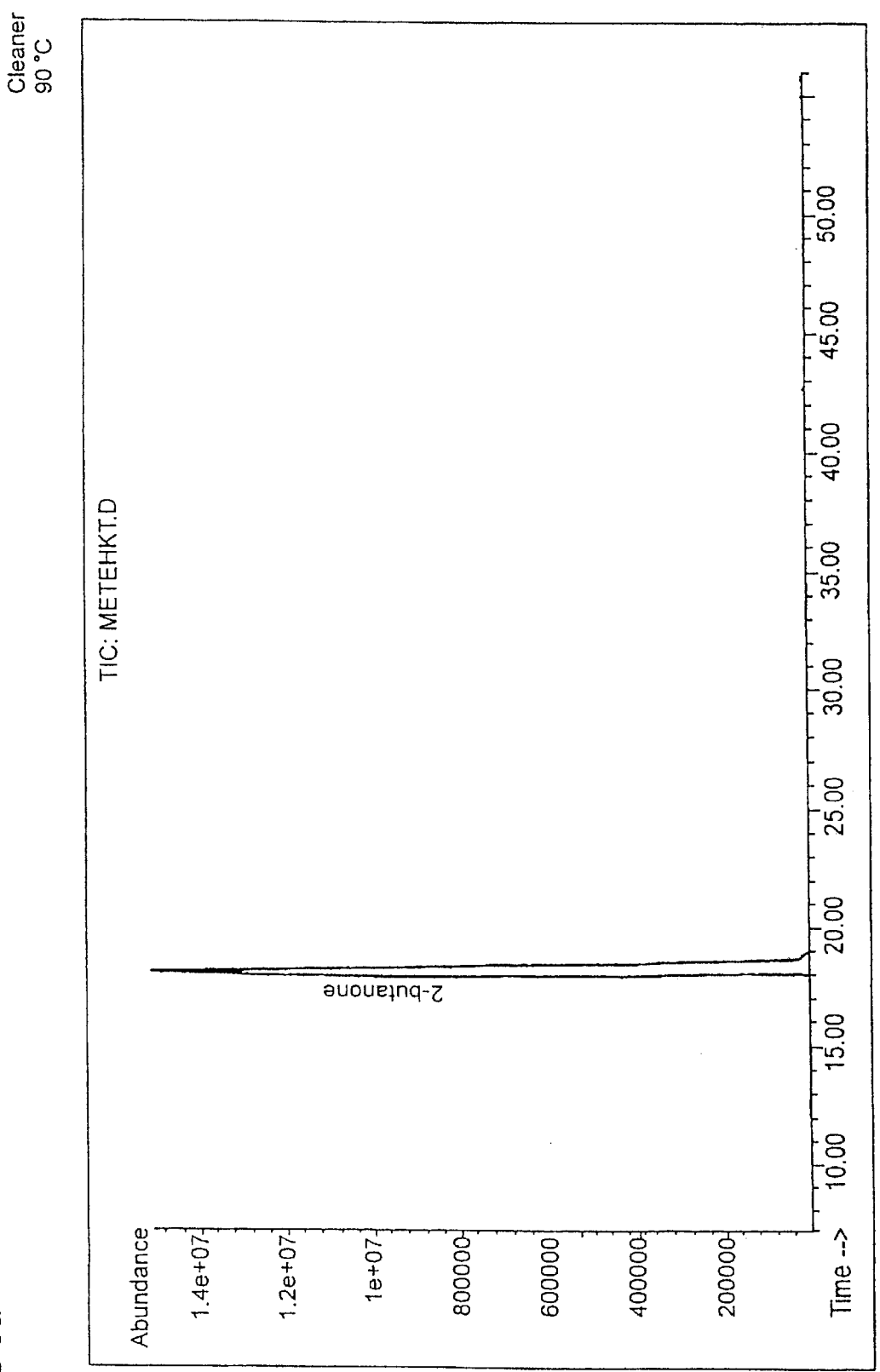
FIG. 9d shows a gas chromatography/mass spectrometry (GC/MS) analysis plot of a head space sample of a general purpose cleaner used in aircraft at 90° C.
Figure 9E:
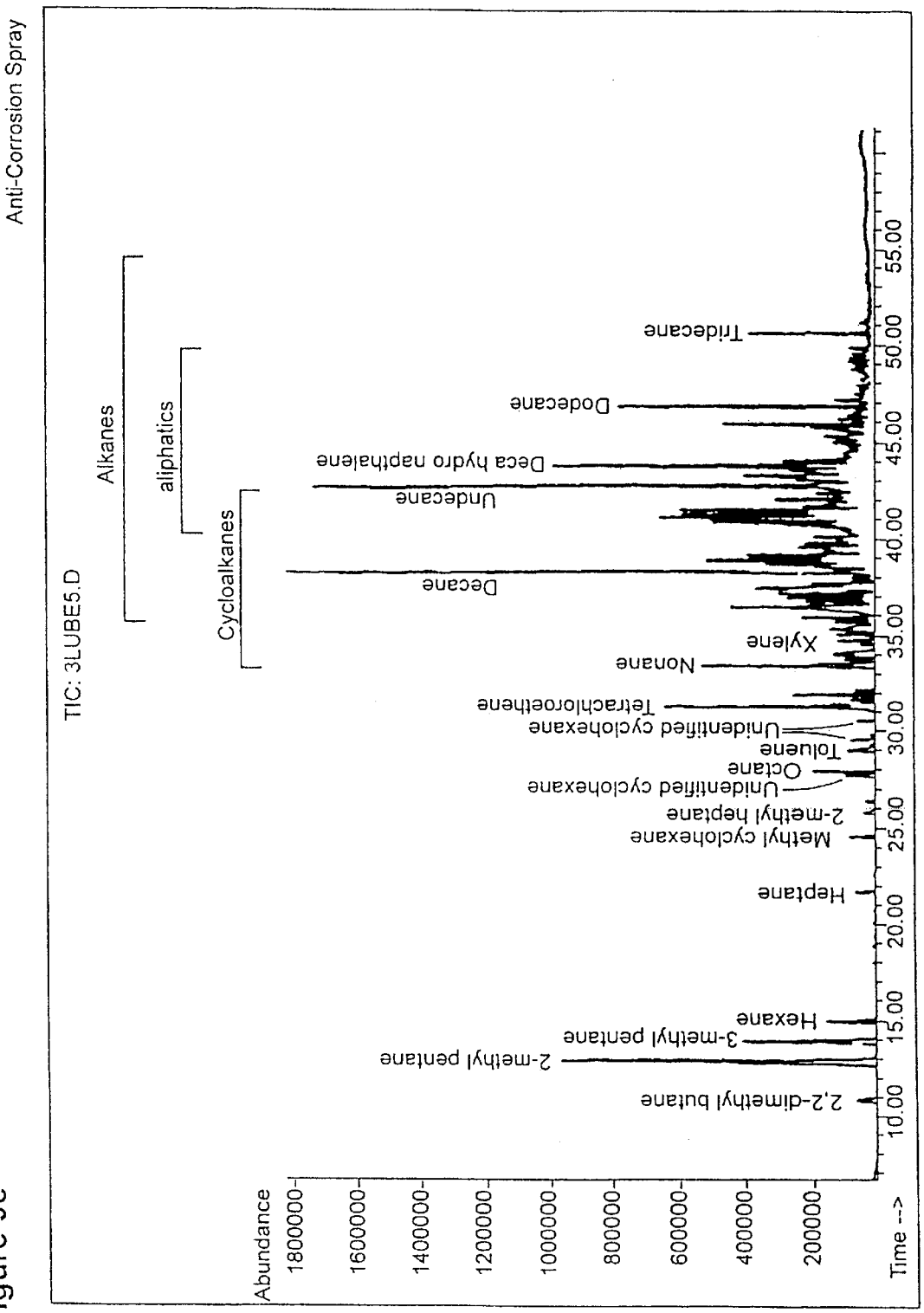
FIG. 9e shows a gas chromatography/mass spectrometry (GC/MS) analysis plot of a head space sample of an anti-corrosion treatment sprayed on metal surfaces in the envelope (−5° C.).

When the envelope air 25 is injected behind the insulation 10, the envelope air 25 will be cooled well below the cabin temperature (for example, by as much as 60° C., going from +20° C. to −40° C.). This cooling, promotes ventilation a contaminant sorption and condensation in the envelope. In particular, most VOCs identified in cabin air (see FIG. 8a) may condense at temperatures well above −40° C. on cold envelope surfaces (for example the interior surface of the fuselage skin 6 and adjoining structural members), during cruising flight. Particles (e.g. oil aerosol) entrained within the envelope air stream 25 may impact and adhere to the interior surface of the skin (or adjoining surfaces), and/or will be removed (by physical filtration or electrical forces) as the air passes through the insulation blanket 10 toward the cabin.

It will be noted that any water vapor present in the envelope air 25 will also tend to condense on the cold surfaces within the envelope 5. However, because of the extremely low relative humidity of the envelope air 25, at least during the cruise phase of flight, the amount of moisture likely to accumulate within the envelope 5 is negligible.

Sorption of VOC's within the envelope 5 can be enhanced by replacing the conventional anti-corrosion treatment 41 with an improved composition having both anti-corrosive and enhanced VOC sorbent properties. The combined anti-corrosion/VOC sorption treatment 41 on the skin and structural members in the envelope is formulated to: not freeze at temperatures above −50° C.; maximize sorption of typical ventilation air VOCs in the temperature range 0 to −40° C.; and maximize desorption of these compounds in the temperature range 10° C. and higher. A particularly suitable formulation will be capable of performing multiple sorption/desorption cycles without hysteresis (i.e. it does not gradually become loaded with effectively permanently sorbed VOC's) or chemical degradation. It contains an anti-oxidant that ensures that it will not harden for several years and so will remain sorbent between regular maintenance cycles when it can be renewed.

The envelope air 25, after being cooled, passes through the insulation 10 to the cabin liner 7. During this passage, the air is heated by the dynamic insulation effect before it enters the cabin 3. If the envelope air 25 is injected in front of the insulation 10, contaminant removal through sorption and condensation is reduced. However, the envelope 5 is still pressurized with dry air throughout, preventing humid cabin air entry and thus allowing the cabin 3 to be humidified to desirable levels. Nozzles placed behind the insulation 10 improve the efficiency of VOC contaminant removal during flight at cruising altitudes through sorption and condensation, removal of ozone through surface contact with reactive materials, and deposition of particles through centrifugal and electrical forces. Nozzles placed in front of the insulation 10 simplify installation and reduce heat loss. Either option, taken alone or in combination, can be utilized as required.

In order to ensure that air passes from the envelope 5 and into the cabin 3, the cabin must be maintained at a slight negative pressure relative to the envelope. This can be accomplished by drawing return air from the cabin 3, by connecting the return air ducts 18 in communication with the cabin space, for example via one or more simple return air grills.

In order to provide enhanced system capability, one or more return air control units 17 are provided at suitable intervals along the length of body 1, as shown in FIGS. 1 and 2. The use of such return air control units 17 permits return air to be selectively drawn from either the cabin or the envelope, as desired thereby facilitating smoke removal, envelope purging, and fire suppressant injection while maintaining a negative pressure in the envelope relative to the cabin. Conveniently, a return air control unit 17 can be provided in association with conventional return air ducting, arrangements previously provided within an existing aircraft. In the illustrated embodiment, a return air control unit 17 is provided in each rib space at the floor level of the upper lobe envelope 5. Each return air control unit 17 comprises a housing 30 having an envelope opening 31 communicating with the upper lobe envelope 5, and a cabin opening 32 communicating with the cabin 3. A damper 33 within the housing 30 enables a selected one of the envelope opening 31 and the cabin opening 32 to be opened and the other to be closed. Thus return air can be selectively drawn from within the envelope 5 or the cabin 3 as desired and in accordance with the operating regime of the aircraft. The position of the damper 33 can be controlled by any suitable drive means (not shown), such as, for example, a solenoid, servo motor or pneumatic actuator in response to control signals B received from the control unit 22. Each return air control unit 17 communicates with the main return air duct 18 through which return air 34 (whether drawn from the envelope or the cabin) can be removed from the upper lobe of the body 1.

Return air 34 from the cabin 3 (or the envelope 5) flows through the main return air duct 18P and is supplied to the (conventional) outflow valve 19. The outflow valve 19 operates in response to control signals C received from the control unit 22 to maintain cabin pressurization, vent at least a portion of the return air 34 out of the aircraft as exhaust air 35 and (possibly) supply the remainder of the return air 34 to the cabin air conditioner 20 as recirculate air 36.

The cabin air conditioner 20 may, for example, generally comprise one or more conventional mixing and filtering units 20a, and a humidity control unit 20b, which operates in response to control signals D from the control unit 22. In opera the cabin air stream 26 from the airflow control device 13, and recirculate air 36 from the outflow valve 19 are combined in a mixing unit 20a, then filtered, cooled (or heated) as required, and humidified by the humidity control unit 20b to create cabin supply air 37. The cabin supply air 37 is then supplied to the cabin through the supply air duct 21.

In the illustrated embodiment, fire suppression is provided by means of a container of chemical fire suppressant 38 such as, for example Halon (trade name) or an equivalent, connected to the envelope supper ducts 14 and 15 via a valve (or valves) 39 which is responsive to a control signal E from the control unit 22. Upon opening the valve 39, chemical fire suppressant is supplied to the envelope 5 to extinguish the fire. This fire suppressant supply could be from an existing cargo fire suppressant system or it could be added.

If desired, each of the envelope supply ducts 14P, 14S, 15P and 15S can be provided with its own valve 39, which can be independently controlled by the control unit 22. In this case, chemical fire suppressant 38 can be drawn from a single, common container, or from separate independent containers as desired. This arrangement has the benefit that chemical fire suppressant can be selectively delivered to any desired quadrant of the envelope 5P, 5S, 8P and 8S. Thus smoke/fire detectors can be strategically distributed within the envelope 5 (for example near electrical devices or other potential sources of ignition) so that the approximate location of a fire can be detected. Upon detection of a fire, the flight crew can choose to flood only that portion of the envelope in which the fire has been detected, thereby conserving fire suppressant and/or facilitating the delivery of higher concentrations of fire suppressant to those areas of the envelope 5 where it is most needed.

The control unit 22 can suitably be provided as an environment control panel within the cockpit of the aircraft. The control unit 22 can be designed as a simple switch panel, allowing the flight crew to manually control the operation of the airflow control device 13, return air control units 17, outflow valve 19, cabin air conditioner 20 and fire suppressant valve 39. Alternatively the control unit 22 can be at least partially automated, such that the operation of the system can be controlled in accordance with one or more predetermined programs and signals.

The environment control system of the invention can be incorporate new aircraft construction, or installed as an upgrade or retrofit in an existing aircraft. Appropriate evaluation of the aircraft mission (e.g. requirements of moisture control, and whether or not air quality control and additionally fire/smoke suppression are required) and testing of the recipient aircraft type (e.g. configuration and geometry) will reveal the numbers, sizing and preferred locations for each of the elements of the system, as well as which ones (if any) of the optional elements (e.g. flow blockers, cabin-side nozzles, selectable flow return air control units, humidifiers etc.) are required in order to obtain desired operational characteristics. Upgrading an existing aircraft ventilation system in accordance with the illustrated embodiment, which incorporates all optional elements, can be accomplished by the following exemplary steps:

The cabin liner 7 and the insulation 10 are removed to obtain access to the envelope 5;

One or more lines of flow blockers 28 are installed on each side;

An anti-corrosion/VOC sorbent material 41 is applied on the metal in the envelope;

The insulation 10 is refitted as necessary to make a continuous blanket Either new insulation can be used or the existing insulation can be reinstated;

The fire suppressant container 38 (existing or new, if desired) and its control valve(s) 39 are installed;

Upper lobe envelope ventilation supply ducts 14 (and lower lobe envelope ventilation supply ducts 15 if desired) and the associated branch lines 16, including shell-side nozzles 27 and (if desired) cabin-side nozzles 29 are installed;

A cabin air conditioner (filter, humidifier) is installed and interconnected. The air conditioner outlet (cabin supply air) is connected to the existing cabin air ducting, which thereafter functions as the cabin supply air duct system;

The airflow control device 13 is installed and connected to the main ventilation duct and to the cabin ventilation and envelope ventilation supply ducts.

Return air control units 17 are installed in the existing return air plenums at the floor level of the cabin envelope 5. Care is required to ensure proper sealing around the housings of the return air control units 17 so as to minimize leakage;

Return air ducts are installed on both sides of the aircraft and connected with the return air control units 17 and the existing outflow valve 19;

The system main control unit 22 is installed in the cockpit and connected to the airflow control device 13, return air control units 17, outflow valve 19 air conditioner 20 and fire suppression valve 39 in order to control the various elements of the system. In addition sensors for detecting temperature, humidity, smoke(fire) within the cabin and envelope and optionally an envelope/cabin pressure difference logger are installed at desired locations within the cabin and envelope and corrected to the control unit 22 to provide information in respect of system operation;

If desired, heat exchanger units are installed in the lower lobe and interconnected with the return air ducts 18, and associated thermostats located in the cargo bay(s) 4, so that the cargo bay(s) 4 can be heated by warm return air 34.

Finally, the cabin liner 7 is reinstalled, with care being taken to close holes and gaps, so that desired pressures can be maintained within normal cabin ventilation air flow rates.

In use the above-described system can provide controlled ventilation of the upper lobe envelope 5 and within the cabin 3 in various ways depending on the flight regime of the aircraft. In the following examples, four exemplary modes of operation of the system are described, with reference to FIGS. 3 to 7.

EXAMPLE 1

Normal Cruising Flight

Under normal operation at cruising altitude, the flows of envelope air 25 and cabin air 26 are controlled such that the envelope pressure is slightly greater than that of the cabin.

The envelope air 25 supplied to the envelope 5 through the shell-side nozzles 27 contacts the cold skin 5 and contaminants are removed at least in part by sorption (e.g., by the anti-corrosion/sorption treatment 41), condensation and filtration (e.g. by centrifugal and electrical forces), and then stored on the interior surface of the skin 5 and other cold surfaces within the envelope or as an aerosol. The extremely low relative humidity of the ventilation air 24 and thus the envelope air 25 (typically less than approx. 5% at cabin temperatures) means that no significant moisture condensation will accumulate within the envelope 5. The envelope air 25 then flows back through the insulation 10 (as shown by the arrows in FIG. 3), and enters the cabin 3 by leakage through the seams 40 between panels of the cabin liner 7.

For example, an envelope pressurization relative to the cabin 3 of between 0.5 and 5 Pa (preferably between approximately 1–2 Pa) and total envelope ventilation air 24 injection flows of less than the minimum cabin ventilation rate required for passenger transport aircraft of 0.55 lbs per person (which is equivalent to 10 c.f.m. per person at 8,000 ft. cabin pressure altitude) can be maintained for a cabin liner 7 paneling leakage area of less than 73 $cm^2$ per person (or, equivalently, 440 $cm^2$ per six passenger row). For a 5 c.f.m. per person envelope air flow rate, and a stack pressure of 2 Pa, the leakage area per six passenger row can be up to 100 $cm^2$. For a leakage area of 440 $cm^2$, moisture diffusion from the cabin to the envelope through typical panel openings is less than 5 mg/s per row (crack length) at a cabin humidity of 60%. At this rate a 30 row 180 passenger plane would accumulate a maximum of about 1 pound of moisture during a three hour flight. Actually, it will be negligible because convective transfer from the envelope to the cabin will offset upstream or back diffusion.

To achieve the allowable leakage areas, the integrity (i.e. minimized leakage area) of the cabin liner 7 paneling must be maintained throughout and any openings at the overhead compartment must be sealed. With this degree of sealing, during a sudden aircraft depressurization event (for example, if a cargo door opens in flight), one or more panels of the cabin liner 7 will "pop" to equalize the pressure difference between the cabin 3 and the envelope 5. Additionally, the damper 33 of the return air control units 17 can be designed so that both the envelope opening 31 and the cabin opening 32 will open automatically in a sudden depressurization event. When insulation continuity is maintained, envelope air 25 entering the cabin 3 from behind the insulation 10 will be warmed by dynamic insulation heat recovery as it passes through insulation gaps.

As shown in FIG. 3 During normal flight at cruising altitude, envelope air 25 is injected behind and/or in front of the insulation 10, and the cabin recirculation system is operating (that is, cabin supply air 37 made up of cabin air 26 and recirculate air 36 are being supplied to the cabin 3 via the cabin air conditioner 20). The return air control units 17 are set so that return air 34 is drawn from the cabin 3. In this mode, the cabin air conditioner 20 can be operated to maintain cabin relative humidity levels in excess of 20% (preferably between 40 and 50%). Moisture condensation within the envelope 5 from humid cabin air is prevented by the relative pressurization of the envelope 5, and the envelope is kept dry. Furthermore, contaminant gases and particles within the envelope air 25 are removed in part prior to entering the cabin 3 by sorption and condensation, and physical filtering as it passes back through the insulation 1, thereby improving cabin air quality over that typically encountered in conventional aircraft.

Return air 34 is drawn from the cabin 3 through the return air control unit(s) 17 and the main return air duct 18. If desired, this return air 34 can be used to heat the lower lobe through the use of one or more heat exchangers (not shown).

The outlet valve 19 operates to vent a portion of the return air 34 out of the aircraft as exhaust air 35 and supplies the remainder as recirculate air 36 to the cabin air conditioner 20.

EXAMPLE 2

Taxi and Ascent

Figure 4:
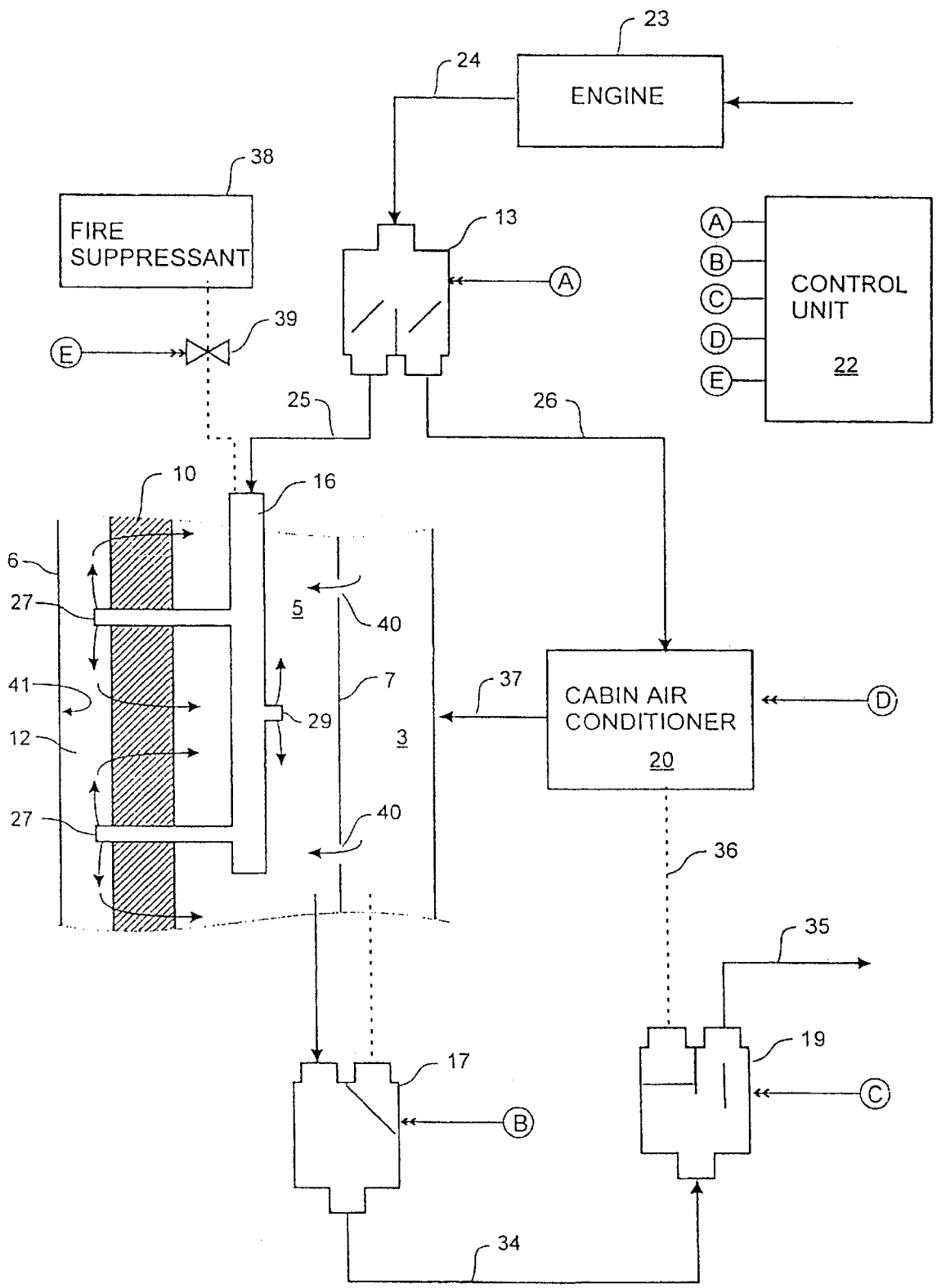
FIG. 4 is a schematic diagram illustrating the operation of the present invention during taxi and ascent.

FIG. 4 illustrates system operation during taxi and ascent to cruising altitude. Conventionally, the cabin pressure is maintained to an altitude equivalent of approximately 8000 ft. which means that the cabin pressure during the cruise phase of flight will be approximately three-quarters of sea level pressure. Thus during the initial portion of ascent, the cabin depressurizes, and approximately one quarter of the air in the envelope 5 at take-off would normally tend to bleed into the cabin 3. During this period, the envelope 5 will be relatively warm in comparison to cruising altitude temperatures, and VOCs sorbed and condensed in the envelope may volatilize. The airflow control device 13 is operated to pressurize the cabin relative to the envelope. At the same time, the return air control units 17 are controlled to draw return air 34 from the envelope 5, and the outflow valve 19 vents all of the return air 34 out of the aircraft as exhaust air 35. This operation effectively purges VOC contaminants (chemical and microbial, if any) within the envelope 5, and prevents them from entering the cabin 3. In a conventional aircraft ventilation system, these contaminants would normally be drawn into the cabin during ascent.

EXAMPLE 3

Descent and Taxi

Figure 5:
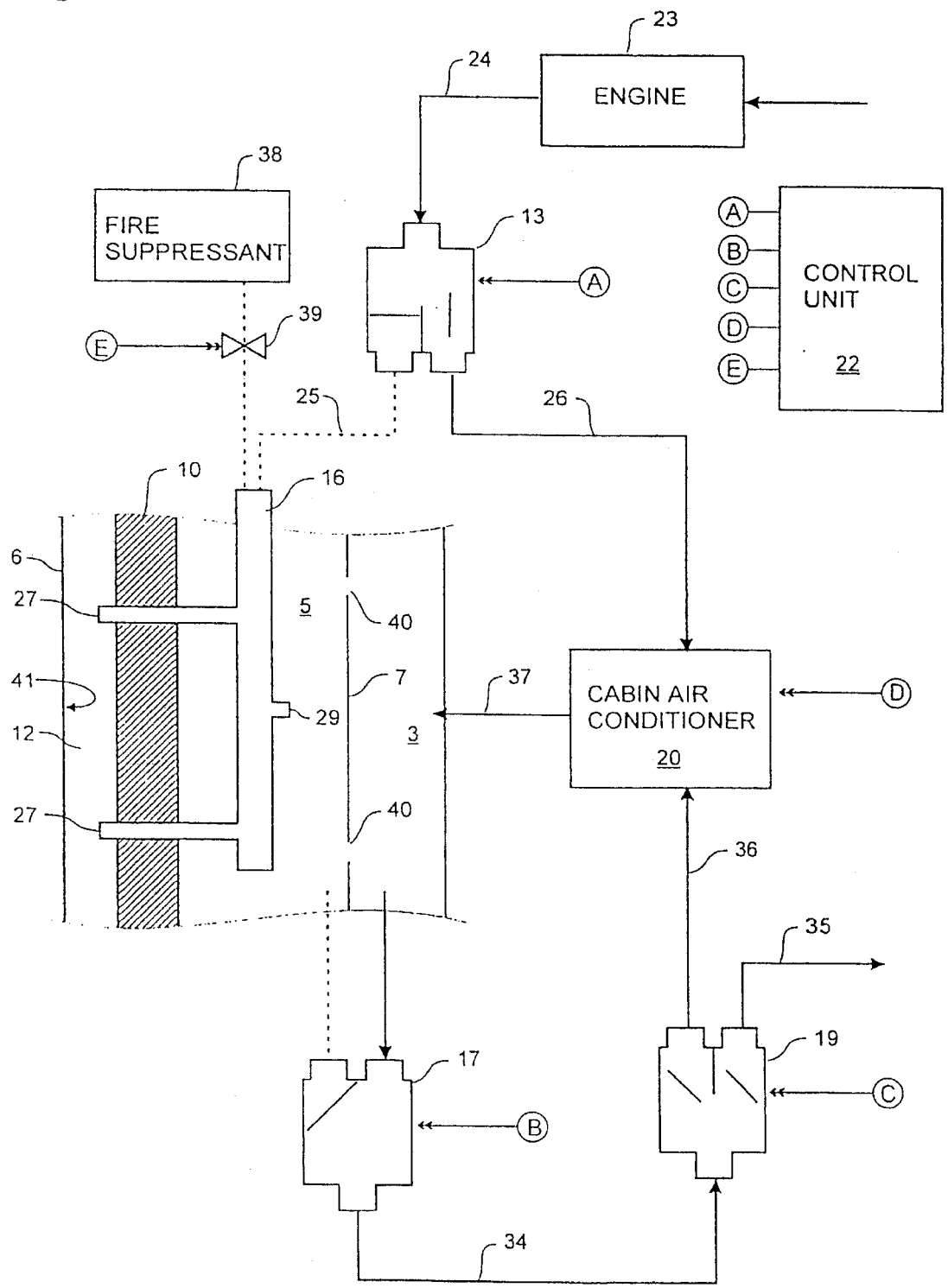
FIG. 5 is a schematic diagram illustrating the operation of the present invention during descent from cruising altitude and taxi after landing.

FIG. 5 illustrates system operation during descent from cruising altitude as the cabin pressurizes, and taxi after landing. During this period the envelope is comparatively cold relative to the outside temperatures, and injection of air into the envelope during this phase of flight would cause accumulation of moisture condensation. Accordingly, for descent and taxi, the airflow control device 13 operates to divert all ventilation air 24 into the cabin air conditioner 20, and the return air control units 17 draw return air 34 from the cabin 3, thereby effectively isolating the envelope 5. The outflow valve 19 can be operated to vent all of the return air 34 as exhaust 35 or recycle some of the return air 34 back to the cabin air conditioner 20 as desired.

EXAMPLE 4

Ground Purging

Figure 6:
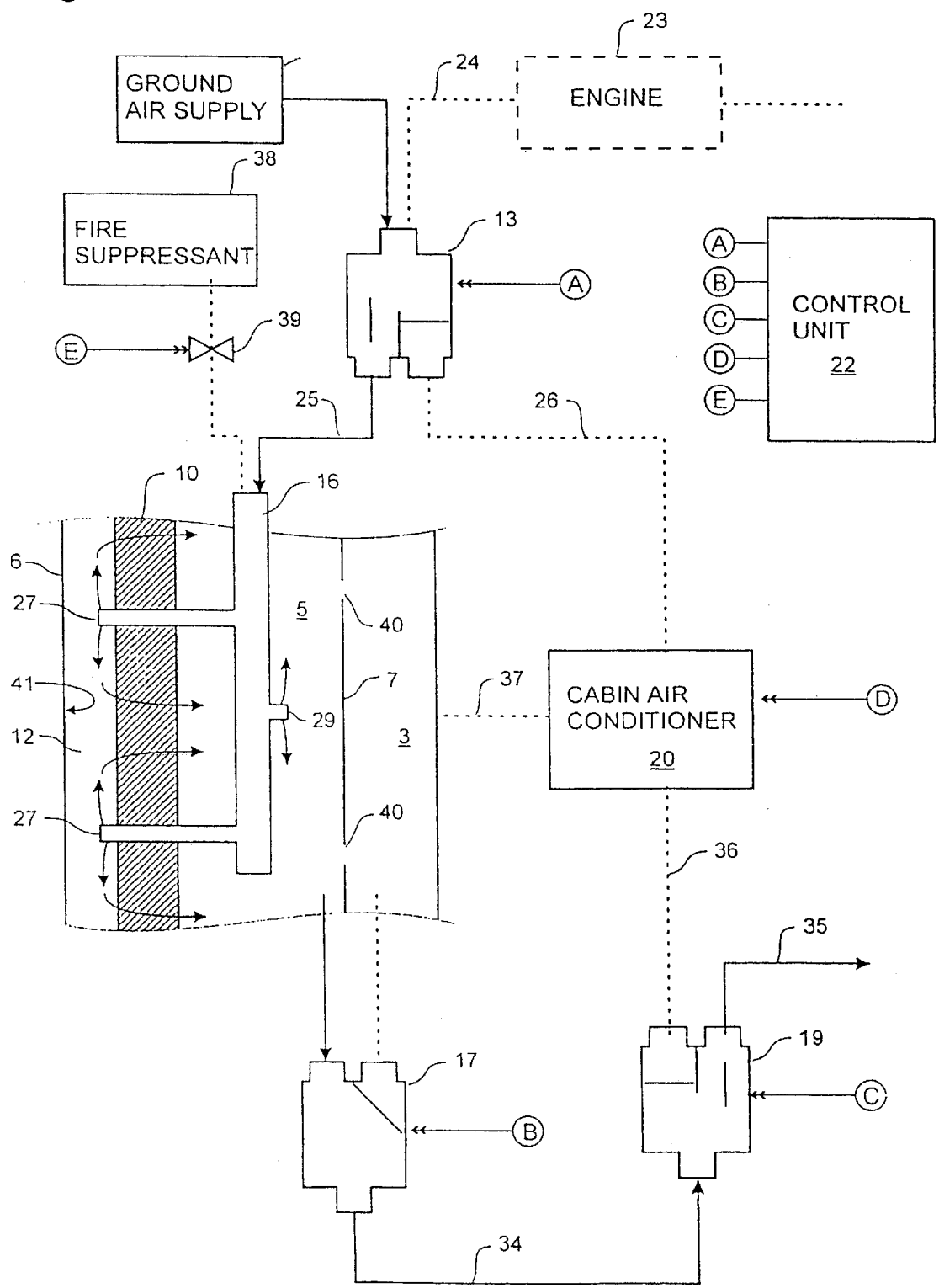
FIG. 6 is a schematic diagram illustrating the operation of the present invention during ground purging of the system.

Operation of the environment control system of the invention during taxi and ascent (Example 2 above) is effective in purging VOCs from the envelope 5. However, in some cases it may be considered good practice to perform additional purging of the upper lobe envelope 5 as well as the lower lobe envelope 8 while the aircraft is parked (such as, for example, between flights). In this case, ventilation air 24 can be provided by a conventional round conditioned air supply unit 42 connected to the two upper lobe ventilation air ducts 14 upstream of the airflow control device 13, as shown in FIG. 6, and to the two lower lobe ducts 15. The airflow control device 13 directs ventilation air 24 into the envelope 5 via branch ducts 16 as envelope air 25, in order to volatilize VOCs adsorbing within the envelope 5 and to remove moisture. The ground conditioned air supply unit 42 is also connected to the lower lobe supply ducts 15 and branch ducts 16 to vent any moisture in this portion of the envelope. In order to accelerate this process, it may be desirable to operate the conditioned air supply unit 42 so as to heat the ventilation air 24 or use engine bleed air. The return air control units 17 are set to draw return air 34 from the envelope 5, and the outflow valve 19 vents all of the return air 34 out of the aircraft as exhaust 35.

This operation will remove moisture and air contaminant accumulation, if present, in the upper and lower lobe envelopes.

EXAMPLE 5

In-flight Fire and/or Pyrolysis

Figure 7:
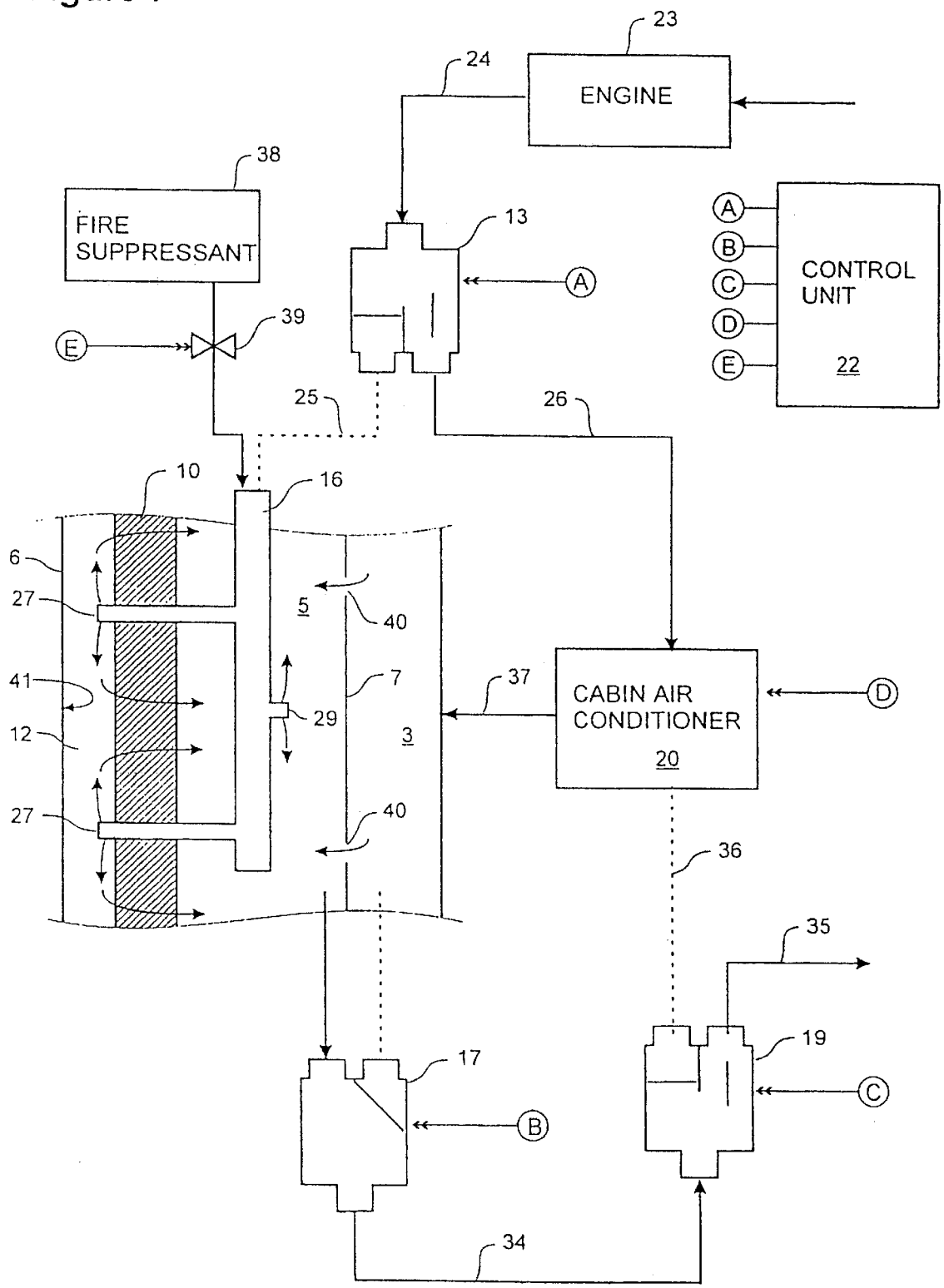
FIG. 7 is a schematic diagram illustrating the operation of the present invention during an in-flight fire event.

FIG. 7 illustrates the air handling system operation during an in-flight fire event in the envelope. When smoke (or combustion products) indicative of a fire is detected, the airflow control device 13 is set to divert all ventilation air 24 to the cabin air conditioner 20. At the same time, the return air control units 17 are set to draw return air 34 from the envelope 5, and the outflow valve 19 operates to vent all of the (smoke-laden) return air 34 out of the aircraft as exhaust air 35. Diversion of the ventilation air 24 to the cabin air conditioner 20 (with the cabin air conditioner 20 on) allows the cabin 3 to be pressurized relative to the envelope 5, and thereby prevent infiltration of smoke and combustion products into the cabin 3 if the fire is in the envelope 5. At that stage, fire suppressant can be injected into the envelope (either the entire envelope 5 can be flooded with fire suppressant, or, alternatively, the fire suppressant may be directed into a selected quadrant of the envelope). Maintaining a positive cabin pressure relative to the envelope ensures that smoke, fire suppressant, and combustion products are substantially prevented from entering the cabin, thereby providing effective separation of passengers from noxious gases.

If desired, however, the cabin air conditioner 20 can be turned off to stop the flow of ventilation air 24 into the cabin 3, after injection of fire suppressant into the envelope 5. This can be used to reduce the supply of oxygen available to the fire, but at the expense of allowing combustion products to leak into the cabin 3.

Alternatively, if the fire is in the lower lobe envelope, then fire suppressant can be injected into that portion of the envelope using ducts 15 and 16. This system has the advantage over current fire suppression systems of not exposing animals, if present, to the health and safety hazards of fire suppressants and their combustion products in combination with fire and smoke.

The above detailed description and examples describe a preferred embodiment of the present invention, in which ventilation air may be independently supplied to each of four quadrants of the envelope 5; shell-side and cabin-side nozzles 27, 29 are respectively used to inject ventilation air behind and in front of the insulation blankets 10; envelope air flows due to stack effects are restricted by the use of flow blockers 28; chemical fire suppressants can be selectively injected into the envelope 5; and means are provided for on-the-ground purging the envelope 5 by the use of a ground conditioned air supply unit connected to the ventilation air inlet ducts. However, the skilled artisan will recognize that these features can be used in any desired combination, depending on the design and mission of the particular aircraft in question.

For example, the skilled artisan will appreciate that the envelope 5 need not necessarily be divided into four quadrants, each of which are served by independent ventilation supply systems. It is not necessary to divide the envelope 5 into upper and lower lobes, if such a division is not desired by the aircraft designer. If desired, the envelope air stream 25, can be divided into upper and lower lobe supply streams, or alternatively both lobes of the envelope 5 can be ventilated using a common envelope air stream 25. Similarly, it is possible to utilize shell-side nozzles 27 alone; or cabin-side nozzles 29 alone; or shell-side nozzles 27 in one area of the envelope 5, and cabin-side nozzles 29 in another area of the envelope 5, all as deemed appropriate by the designer.

Similarly, the skilled artisan will appreciate that the envelope 5 need not necessarily be divided into upper and lower, port and starboard quadrants. In practice, it is possible to divide the envelope 5 as required to provide a localized ventilation regime appropriate to a specific portion of the envelope 5. For example, it may be desirable to provide a ventilation regime in the crown portion of the envelope 5 (e.g. to eliminate "rain-in-the-plane" phenomenon) which differs from that provided in the sides of the envelope 5. Division of the envelope 5 in this manner can readily be accomplished by means of the present invention.

Furthermore, the skilled artisan, will also recognize that, just as the envelope 5 can be divided radially into quadrants, it is also possible to divide the envelope 5 longitudinally into sections, such as, for example, by means of suitable flow blockers 28 circumferentially disposed between the cabin liner 7 and the shell 6. Each longitudinal section may also be provided with independent envelope and cabin air streams 25, 26, and may also include its own set of return air control units 17, and return air ducts 34 etc. to thereby allow envelope ventilation control independent of other sections of the envelope 5. For example, it may be desirable to provide independently controllable envelope/cabin ventilation (e.g. in terms of air pressures and flow rates) in the cockpit and passenger cabin. Furthermore, within the passenger cabin, in may be desirable to have differing envelope ventilation regimes within passenger seating and food preparation areas. This can be accomplished by longitudinally dividing the envelope 5 into appropriate sections, and providing envelope and cabin ventilation air ducts 14, 21, appropriate cabin and/or shell-side nozzles 27, 29, and return air control units 17 etc. as required to provide the desired ventilation regime within each section. Longitudinal division of the envelope 5 also creates a further mode of operation of the system of the present invention during a fire or pyrolysis event. In particular, in a case of smoke in the cockpit, it would be possible to control ventilation regimes in all of the sections of the envelope 5 to deliver maximum air flow to the cockpit (perhaps with reduced ventilation air flow to the passenger cabin), and thereby more effectively purge smoke and combustion products from the cockpit area.

In the illustrated embodiment, the return air control unit 17 and cabin air inlet 32 are located in the envelope space 5 near the floor 2 of the cabin. However, it will be appreciated that these components may equally be located elsewhere as deemed appropriate by the aircraft designer. Similarly, the locations or the envelope ventilation supply ducts 14, 15, the return air ducts 18 and the cabin ventilation supply duct 21 can be varied as deemed appropriate by the designer.

The ability of the system of the invention to pressurize the cabin relative to the envelope, or vise-versa, is inherent to the present invention, and may be utilized to achieve any of the operating modes (in terms of envelope and cabin ventilation, and return air recirculation and venting) described in the above examples. However, it will be apparent that one or more of the operating modes may be omitted, if such mode of operation is unnecessary for the mission and/or design of any particular aircraft. For example, in some aircraft, it may be desirable or necessary to omit operating modes in which the cabin is pressurized relative to the envelope. In such circumstances, all return air may be drawn from the cabin exclusively, in which case the return air control unit 17 may be replaced by a simple fixed return air inlet in communication with the return air ducts 18.

It is considered that the use of flow blockers 28 will reduce natural convective (stack-effect) air flows within the envelope, and that this would likely have the effect of reducing moisture condensation within the envelope, even in the absence of envelope pressurization. The capability of the system of the present invention to pressurize the envelope with dry ventilation air will serve to virtually eliminate moisture condensation within the envelope, at least during the cruise portion of the flight cycle. The skilled artisan, will appreciate that flow blockers 28 may be used independently of the other elements of the invention described herein. Thus the skilled artisan will recognize that flow blockers 28 could be incorporated into an aircraft, even in the absence of an envelope ventilation system. Similarly, an envelope ventilation system may be used either in conjunction with, or without, flow blockers 28.

Thus it will be appreciated that the above description of a preferred embodiment is intended to describe various elements, which may be used alone or in any desired combination as desired to achieve as appropriate to the particular circumstances. It will therefore be understood that the above-described preferred embodiment is intended to be illustrative, rather than limitative of the present invention, the scope of which is delimited solely by the appended claims.

What is claimed is:

1. An environment control system installed in the body of an aircraft having a body shell enclosing an inner space, a liner disposed within the inner space and defining an envelope space between the liner and the body shell and an interior space on the other side of the liner, an air supply for providing a flow of dry ventilation air to the inner space of the body, an envelope air distribution system for directing air from the air supply into the envelope space, a return air control unit capable of drawing return air from the interior space, and an air flow controller which controls the flow of air into the envelope space to develop a sufficient pressure in the envelope space relative to the pressure in the interior space to substantially prevent the flow of air from the interior space into the envelope space caused by stack pressure across the liner between the envelope space and the interior space which tends to cause air to flow across the liner from the interior space into the envelope space.

2. An environment control system as claimed in claim 1, further comprising means for directing a flow of ventilation air from said air supply into said interior space.

3. An environment control system as claimed in claim 1, wherein the envelope air distribution system comprises at least one envelope supply duct disposed longitudinally in the aircraft body and at least one respective ventilation air branch line disposed within said envelope space for feeding ventilation air from said supply duct into said envelope space.

4. An environment control system as claimed in claim 3, wherein each ventilation air branch line includes at least one nozzle for injecting ventilation air into the envelope space.

5. An environment control system as defined in claim 4, wherein at least one nozzle is a shell-side nozzle capable of injecting envelope space ventilation air between an insulation jacket disposed in said envelope space, and said body shell.

6. An environment control system as defined in claim 5, wherein two or more shell-side nozzles are provided in communication with each ventilation branch line, the shell-side nozzles being disposed at spaced intervals around a circumference of the envelope space.

7. An environment control system as defined in claim 6, wherein at least one nozzle is an interior space-side nozzle capable of injecting envelope ventilation air between an insulation jacket and the liner.

8. An environment control system as defined in claim 7, wherein two or more interior space-side nozzles are provided in communication with each ventilation branch line, the interior space-side nozzles being disposed at spaced intervals around the circumference of the envelope space.

9. An environment control system as defined in claim 1, wherein an anti-corrosion/volatile organic compound sorption treatment is applied to an interior surface of the aircraft structure possibly exposed to condensation.

10. An environment control system as defined in claim 9, wherein the anti-corrosion/volatile organic compound sorption treatment is formulated to provide acceptable characteristics of:

adhesion to metal surfaces;

hydrophobic;

low flammability; and low off-gassing at typical envelope space temperatures during cruising flight.

11. An environment control system as defined in claim 10, wherein the anti-corrosion/volatile organic compound sorption treatment is formulated to:

resist solidification within the aircraft envelope space;

sorb ventilation air volatile organic compound at typical envelope space temperatures during cruising flight and desorb said ventilation air volatile organic compounds at warmer temperatures substantially without hysteresis.

12. An environment control system as defined in claim 1, wherein the return air control unit is adapted to draw the return air stream from the interior space only.

13. An environment control system as defined in claim 12, wherein the return air control unit comprises a housing, an envelope opening defined in the housing and in communication with the envelope, an interior space opening defined in the housing and in communication with the interior space, and a damper capable of selectively closing the envelope opening and the interior space opening.

14. An environment control system as defined in claim 1, wherein the liner has a leakage area such that the flow of air into the envelope space required to develop a pressure in said envelope space required to develop a pressure in the interior space is less than 10cfm per occupant seat.

15. An environment control system as defined in claim 1, further comprising air flow barriers disposed within the envelope space and which divide the envelope space into a plurality of envelope space sections, and ventilation means capable of supplying ventilation air from said distribution system to an envelope space section at a flow rate which is different from the flow rate of air to another envelope space section.

16. An environment control system as claime in claim 15, wherein said ventilation means includes ventilation to each envelope space section.

17. An environment control system as defined in claim 16, wherein a flow blocker is disposed within the envelope space at approximately mid-height of an upper lobe of the body of the aircraft.

18. An environment control system as defined in claim 2, wherein the interior space air distribution system comprises:
    an air conditioner communicating with the air supply for receiving interior ventilation air for the interior space and operative to condition the interior space ventilation air to create supply air for the interior space; and
    a supply air duct capable of directing the interior space supply air into the interior space.

19. An environment control system as defined in claim 18, wherein the air conditioner is operative to maintain a relative humidity of the cabin supply air of at least 20%.

20. An environment control system as defined in claim 19, wherein the air conditioner is operative to maintain a relative humidity of the cabin supply air of between 20% and 80%.

21. An environment control system as defined in claim 20, wherein the air conditioner is operative to maintain a relative humidity of the cabin supply air of between 40% and 70%.

22. An environment control system as defined in claim 16, wherein each envelope section has a respective duct for enabling air to be drawn therefrom,
    and further including a controller for controlling the flow of air from an envelope space section independently of another envelope space section.

23. An environment control system as defined in claim 15, further comprising an insulation jacket disposed within said envelope space and wherein the ventilation means for at least one envelope space section includes a ventilation outlet port between said jacket and said shell.

24. An environment control system as defined in claim 15, further comprising an insulation jacket disposed in said envelope space, and wherein said envelope space for at least one envelope space section includes a ventilation outlet port disposed between said insulation jacket and said liner.

25. An environment control system as defined in claim 1, wherein said air supply is provided from an engine of said aircraft, and said control system comprises a first air conditioner for controlling the temperature of the air from said engine and for supplying said air to said envelope air distribution system, a second air conditioner for receiving air supplied from an engine of said aircraft and for conditioning the temperature of said air, and air feeding means for feeding the air from said second air conditioner into said interior space.

26. An environment control system as defined in claim 1, wherein the interior space includes at least one floor defining a cabin space above said floor, and said system further comprises flow barrier means, including a flow blocker, disposed in said envelope space at a level different than the level of the or each cabin space floor, and defining an upper envelope space above said flow blocker and a lower envelope space below said flow blocker, wherein said flow barrier means is arranged to substantially prevent air which resides in the upper and lower envelope spaces from flowing between said upper envelope space and said lower envelope space, through the space between said body shell and said liner, thereby to reduce stack pressure across said liner.

27. An environment control system as claimed in claim 26, wherein insulation is disposed in said envelope space, and said flow blocker is disposed between at least one of said liner and said insulation and said body shell and said insulation.

28. An environment control system as defined in claim 27, wherein the envelope air distribution system comprises at least one nozzle capable of injecting at least a portion of the envelope ventilation air steam into a portion of the envelope below said flow blocker, and at least one nozzle capable of injecting at least a portion of the envelope above said flow blocker.

29. The method of claim 26, further comprising the step of humidifying the interior space ventilation air prior air supplying the same to the interior space.

30. The method of claim 26, further comprising the steps of venting a portion of the return air stream out of the aircraft and recirculating a remaining portion of the return air stream back into the interior space.

31. A method as claimed in claim 26, wherein the surface of the body shell within the envelope space has an anti-corrosion/volatile organic compound sorption treatment applied thereto and the step of supplying envelope space ventilation air to the envelope space includes directing the ventilation air at the anti-corrosion/volatile organic compound treatment on the inside surface of said body shell.

32. A method as claimed in claim 26, wherein the step of supplying envelope space ventilation air to the envelope space comprises the step of passing said ventilation air through at least one nozzle.

33. A method of controlling the environment within an aircraft body having a body shell enclosing an inner space, a liner disposed within the inner space and defining an envelope space between the liner and the body shell and an interior space on the other side of the liner, the method comprising:
    a) providing a flow of dry ventilation air;
    b) dividing the flow of ventilation air into an envelope space ventilation air stream and an interior space ventilation air stream;
    c) supplying the envelope space ventilation air to the envelope space;
    d) supplying the interior space ventilation air to the interior space;
    e) drawing a return air stream from the interior space; and
    f) controlling the envelope space ventilation air stream and the interior space ventilation air stream to develop a sufficient pressure in the envelope space relative to the pressure in the interior space to substantially prevent the flow of air from the interior space into the envelope space caused by stack pressure across the liner between the envelope space and the interior space which tends to cause air to flow across the liner from the interior space into the envelope space.

34. The method of claim 33, further comprising the step of injecting at least a portion of the envelope ventilation air into a space between said body shell and an insulation jacket disposed between said liner and said body shell.

35. The method of claim 33, further comprising the step of injecting at least a portion of the envelope ventilation air into a space between an insulation jacket, disposed in said envelope space, and said liner.

36. The method of claim 33, further comprising the step of humidifying the interior space ventilation air prior to supplying the same to the interior space.

37. The method of claim 33, further comprising the steps of venting a portion of the return air stream out of the aircraft and recirculating a remaining portion of the return air stream back into the interior space.

38. A method as claimed in claim 33, wherein the surface of the body shell within the envelope space has an anti-corrosion/volatile organic compound sorption treatment applied thereto and the step of supplying envelope space ventilation air to the envelope space includes directing the ventilation air at the anti-corrosion/volatile organic compound treatment on the inside surface of said body shell.

39. A method as claimed in claim 33, wherein the step of supplying envelope space ventilation air to the envelope space comprises the step of passing said ventilation air through at least one nozzle.

40. A method as claimed in claim 33, further comprising the step of providing a flow blocker in the envelope space at a level other than the level of a floor of the interior space and defining an upper envelope space above said flow blocker and a lower envelope space below said flow blocker, wherein said flow blocker is arranged to sunstantially prevent air which resides in the upper and lower envelope spaces from flowing between said upper envelope space and said lower envelope space through the space between said body shell and said liner, thereby to reduce stack pressure across said liner.

41. An environment control system installed in the body of an aircraft, the aircraft having a body shell enclosing an inner space, a liner disposed within the inner space and defining an envelope space between the liner and the body shell, and an interior space on the other side of the liner, the interior space including at least one floor defining a cabin space above said floor, the environment control system comprising flow barrier means, including a flow blocker, disposed in said envelope space at a level different than the level of the or each cabin space floor and defining an upper enbelope space above said flow blocker and a lower envelope space below said flow blocker, wherein said flow barrier means is arranged to substantially prevent air which resides in the upper and lower envelope spaces from flowing between said upper envelope space and said lower envelope space through the space between said body shell and said liner, thereby to reduce stack pressure across said liner.

42. An environment control system as claimed in claim 41, comprising insulation disposed in said envelope space, and wherein said flow blocker is disposed between at least one of said liner and said insulation and said body shell and said insulation.

43. An environment control system as claimed in claim 42, wherein said flow blocker is arranged to compress said insulation towards said body shell.

44. An environment control system as claimed in claim 41, wherein said flow blocker is positioned at about mid-height of said envelope space above said floor level.

45. An environment control system as claimed in claim 41, comprising at least one said flow barrier means disposed within the envelope space on each side of said aircraft.

46. An enviroment control system as claimed in claim 45, comprising a plurality of said flow barrier means disposed within said envelope space on each side of said aircraft, and being spaced from one another about the circumference of said envelope space.

47. An environment control system as claimed in claim 41, further comprising an air supply for providing a flow of dry ventilation air to the inner space of the body, an envelope air distribution system for directing air from the air supply into the envelope space and wherein the envelope air distribution system includes at least one outlet port for injecting envelope ventilation air into said upper envelope ventilation air into the lower envelope space.

48. An environment control system installed in the body of an aircraft having a body shell enclosing an inner space, a linear disposed within the inner space and defining an envelope space between the linear body shell, and an interior space on the other side of the linear,
    an air supply for providing a flow of dry ventilation air into the inner pace of the body,
    air feeding means for feeding a flow of air from the air supply into the envelope space, and wherein the linear has a leaskage area such that the flow of air into the envelope space required to develope a pressure in the envelope space of at least 0.5Pa above the pressure in the interior space is less than 10cfm per occupant seat.

49. An environment control system as claimed in claim 48, wherein the interior space includes a cabin space for accomodating people and having a cabin space floor, the environment control system further comprising flow barrier means, including a flow blocker, disposed in said envelope space above the level of said cabin space floor and defining an upper envelope space above said flow blocker and a lower envelope space below said flow blocker, wherein said flow barrier means is arranged to substantially prevent air which resides in the upper and lower envelope spaces from flowing between said upper envelope space and said lower envelope space through the space between said body shell and said linear, thereby to reduce stack pressure across said linear.

50. An environment control system installed in the body of an aircraft, the aircraft having a body shell enclosing an inner space, a linear disposed within the inner space and defining an envelope space between the liner and body shell and an interior space on the other side of the liner, and insulation disposed within said envelope space, the control system comprising an air supply for providing a supply of air from an engine of said aircraft to the inner space of the body, an envelope air distribution system for directing air into the envelope space, said distribution system comprising at least one envelope supply duct for feeding air along said aircraft body and at least one ventilation air branch line disposed within said envelope space for feeding ventilation air from said supply duct into said envelope space between said linear and said insulation, a first air conditioner for controlling the temperature of the air from said engine and for supplying said air to said distribution system, a second air conditioner for receiving air supplied from an engine of said aircraft and for conditioning the temperature of said air, and air feeding means for feeding the air from said second air conditioner into said interior space.

51. An environment control system as claimed in claim 50, further comprising means for feeding air from said first air conditioner to said second air conditioner.

52. An environment control system as claimed in claim 51, comprising an air flow controller for controlling the flow of air from said first air conditioner to said second air conditioner.

53. An environment control system as claimed in claim 50, further comprising an air flow controller for controlling the flow of air from said first air conditioner to said air distribution system.

54. An environment control system as claimed in claim 50, further comprising a return air control unit capable of drawing return air from the interior space.

55. An environment control system as claimed in claim 54, further comprising a mixing unit for mixing air supplied from said engine and from said return air control unit, and supplying the mixed air to said interior space.

56. An environment control system as claimed in claim 50, further comprising a return air control unit capable of drawing air from said envelope space.

57. An environment control system as claimed in claim 50, further including air flow barriers disposed within the envelope space and which divide the envelope space into a plurality of envelope space sections, and ventilation means capable of supplying ventilation air from said distribution system to an envelope space section at a flow rate which is different from the flow rate of air to another envelope space section.

58. An environment control system as claimed in claim 57, including ventilation control means for independently controlling the ventilation to each envelope space section.

59. An environment control system as claimed in claim 57, further comprising an insulation jacket disposed within said envelope space, and wherein said ventilation system includes a ventilation outlet port for at least one envelope space section disposed between said insulation jacket and said shell.

60. An environment control system as claimed in claim 57, further comprising an insulation jacket disposed within said envelope space, and wherein said distribution system includes a ventilation outlet port for at least one envelope space section disposed between said insulation jacket and said liner.

61. An environment control system as claimed in claim 50, wherein the liner has a leakage area such that the flow of air into the envelope space required to develope a pressure in said envelope space of at least 0.5Pa above the pressure in the interior space is less than 10cfm per occupant seat.

62. An environment control system installed in the body of an aircraft, the aircraft having a body shell enclosing an inner space, a liner disposed within the inner space and defining an envelope space between the liner and the body shell, and an interior space on the other side of the liner, the control system comprising:

an envelope exhaust controller arranged for receiving gas directly from said envelope space and expelling said gas from said aircraft, and control means for controlling the pressure of gas in said inner space to maintain the pressure of said envelope space below that of said interior space.

63. An environment control system as claimed in claim 62, further comprising an air supply for providing a flow of air to the inner space of the body, means for directing a flow of ventilation air from said air supply into said interior space, and wherein said control means includes an air flow controller for controlling the flow of air into said interior space to maintain the pressure in the interior space above that of the envelope space.

64. An environment control system as claimed in claim 62, wherein said envelope exhaust controller includes a plurality of envelope exhaust ports spaced apart in a direction along the length of said envelope space.

65. An environment control system as claimed in claim 64, wherein said envelope exhaust controller further comprises a plurality of valves, each for controlling the flow ofn gas from a respective envelope exhaust port.

66. An environment control system as claimed in claim 62, further comprising air flow barriers disposed within the envelope space and which divide the envelope space into a plurality of envelope space sections, each section having an exhaust outlet port, and wherein said envelope exhaust controller is capable of controlling the flow of gas drawn from an envelope space section independently of another envelope space section.

67. An environment control system as claimed in claim 62, further comprising a fire suppression system for releasing a flow of fire suppressant into the envelope space.

68. An environment control system as claimed in claim 67, further comprising an air supply for providing a flow of dry ventilation air into the inner space, an envelope air distribution system for directing air from the air supply into the envelope space, and wherein the fire suppression system is connected to said envelope air distribution system for introducing fire suppressant into said distribution system.

69. An environment control system as claimed in claim 68, wherein said fire suppressant system comprises a container of fire suppressant and a valve operable to introduce fire suppressant from said container into said envelope air distribution system.

70. An environment control system as claimed in claim 67, wherein the first suppressant comprises any one or more of Halon, carbon dioxide, nitrogen, and other fire suppressant agents, or mixtures of these.

71. An environment control system as claimed in claim 62, wherein an anti-corrosion/volatile organic compound absorption treatment is applied to an interior surface of the aircraft structure possibly exposed to condensation.

72. An environment control system as claimed in claim 71, wherein the anti-corrosion/VOC sorption treatment is formulated to provide acceptable characteristics of: adhesion to metal surfaces; hydrophobic; low flammability; and low off-gassing at typical and below temperatures during cruising flight.

73. An environment control system as claimed in claim 71, wherein the anti-corrosion/VOC sorption treatment is formulated to: resist solidification within the aircraft envelope; sorb ventilation air VOCS at typical envelope temperatures during cruising flight and de-sorb said ventilation air VOCS at warmer temperatures substantially without hysterics.

74. The method of controlling the environment within an aircraft body, the body having a body shell enclosing an inner space, a liner disposed within the inner space and defining an envelope space between the liner and the body shell, and an interior space on the other side of the liner, an envelope exhaust duct for drawing gas directly from the envelope space and exhausting said gas from said aircraft, the method comprising the steps of:

drawing gas directly from said envelope space through said duct and exhausting the gas drawn through said duct directly from said aircraft, and controlling the pressure of gas in the liner space such that the pressure in the envelope space is below that of the interior space.

75. A method as claimed in claim 74, further comprising providing a flow of dry ventilation air into the interior space and controlling the pressure of air in said inner space such that the pressure of air in said interior space is greater than the pressure or air in said envelope space.

76. A method according to claim 74, further comprising supplying ventilation air to said envelope space.

77. A method according to claim 74, comprising performing the step of drawing gas from said envelope space when the aircraft is either on the ground, during the period of aircraft ascent to cruising altitude, or detecting smoke or fire in the envelope space and/or when injecting fire suppressant into the envelope space.

* * * * *